(12) United States Patent
Bittlinger et al.

(10) Patent No.: US 10,869,470 B2
(45) Date of Patent: Dec. 22, 2020

(54) DEVICE FOR HOLDING BAIT FOR RODENTS

(71) Applicants: Wolfgang Bittlinger, Nuremberg (DE); Jürgen Buchstaller, Nuremberg (DE)

(72) Inventors: Wolfgang Bittlinger, Nuremberg (DE); Jürgen Buchstaller, Nuremberg (DE)

(73) Assignee: Jürgen Buchstaller, Nürnberg (DE)

( * ) Notice: Subject to any disclaimer, the term of this patent is extended or adjusted under 35 U.S.C. 154(b) by 509 days.

(21) Appl. No.: 15/543,896

(22) PCT Filed: Feb. 18, 2015

(86) PCT No.: PCT/DE2015/000073
§ 371 (c)(1),
(2) Date: Jul. 14, 2017

(87) PCT Pub. No.: WO2016/116079
PCT Pub. Date: Jul. 28, 2016

(65) Prior Publication Data
US 2018/0007889 A1 Jan. 11, 2018

(30) Foreign Application Priority Data

Jan. 19, 2015 (DE) .................. 10 2015 000 348

(51) Int. Cl.
*A01M 25/00* (2006.01)
*A01M 1/20* (2006.01)

(52) U.S. Cl.
CPC ......... *A01M 25/004* (2013.01); *A01M 1/2005* (2013.01)

(58) Field of Classification Search
CPC . A01M 25/002; A01M 25/004; A01M 1/2005
See application file for complete search history.

(56) References Cited

U.S. PATENT DOCUMENTS

| 1,119,502 | A | * | 12/1914 | Evans | .............................. 43/107 |
| 2,340,255 | A | * | 1/1944 | Weil | ..................... A01M 1/2005 43/131 |
| 2,429,377 | A | * | 10/1947 | Stevens | ................... A01M 1/10 43/118 |
| 2,772,511 | A | * | 12/1956 | Tomasek | ............. A01M 1/2016 43/131 |

(Continued)

FOREIGN PATENT DOCUMENTS

| DE | 19515454 | A1 | * | 11/1995 | .......... A01M 1/2005 |
| DE | 19526043 | A1 | * | 1/1997 | .......... A01M 1/2005 |

(Continued)

OTHER PUBLICATIONS

Lincoln, et al: "University of Nebraska—Methods of Sewer Rat Control", Methods of Sewer Rat Control, Jan. 1, 1962 (Jan. 1, 1962), XP055195437.

*Primary Examiner* — Magdalena Topolski
*Assistant Examiner* — Morgan T Barlow
(74) *Attorney, Agent, or Firm* — Rimôn, P.C.

(57) ABSTRACT

An apparatus for holding bait for rodents that includes a housing that can be inserted into a manhole, the housing having one or more bait platform, a passage through the housing for rodents to access the bait platform, and optionally a mechanism to prohibit exposure of bait on the bait platform to the environment containing the housing.

28 Claims, 21 Drawing Sheets

(56) References Cited

U.S. PATENT DOCUMENTS

Figure 1:
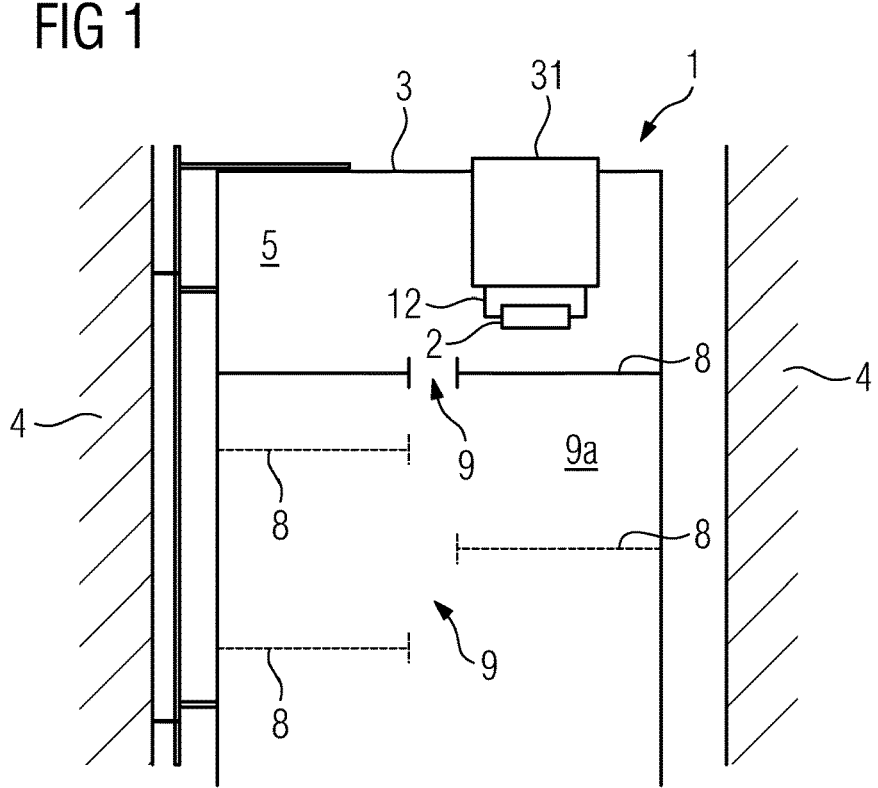

| | | | | | |
|---|---|---|---|---|---|
| 2,860,445 | A | * | 11/1958 | Yates | A01M 23/00 43/131 |
| 3,517,454 | A | * | 6/1970 | Query | A01M 25/004 43/131 |
| 4,035,946 | A | * | 7/1977 | Rapp | A01M 25/004 43/131 |
| 4,400,904 | A | * | 8/1983 | Baker | A01M 25/004 119/52.4 |
| 4,550,525 | A | * | 11/1985 | Baker | A01M 25/004 43/131 |
| 4,625,452 | A | * | 12/1986 | Knote | A01M 25/004 43/131 |
| 5,693,331 | A | * | 12/1997 | Ballard | A01M 1/2005 424/405 |
| 5,875,586 | A | * | 3/1999 | Ballard | A01M 1/2005 43/131 |
| 5,918,409 | A | * | 7/1999 | Carnwath | A01M 19/00 43/61 |
| 6,016,623 | A | * | 1/2000 | Celestine | A01M 23/04 43/61 |
| 6,151,828 | A | * | 11/2000 | Genero | A01M 1/2005 43/121 |
| 6,182,482 | B1 | * | 2/2001 | Issitt | A01M 25/004 292/116 |
| 6,571,509 | B2 | * | 6/2003 | Frasier | A01M 25/004 43/131 |
| 6,966,500 | B1 | * | 11/2005 | Kelley | A01M 31/008 239/34 |
| 2001/0054249 | A1 | * | 12/2001 | Baker | A01M 1/2005 43/133 |
| 2002/0167409 | A1 | * | 11/2002 | Cristofori | A01M 23/08 340/573.2 |
| 2004/0128903 | A1 | * | 7/2004 | Wexler | A01M 1/106 43/122 |
| 2005/0252074 | A1 | * | 11/2005 | Duston | A01M 1/2005 43/131 |
| 2006/0032110 | A1 | * | 2/2006 | Yang | A01M 1/026 43/60 |
| 2006/0265944 | A1 | * | 11/2006 | Meier | A01M 1/026 43/131 |
| 2008/0083375 | A1 | * | 4/2008 | Stepanian | A01K 39/0113 119/52.3 |
| 2009/0193707 | A1 | * | 8/2009 | Moran | A01M 23/16 43/58 |
| 2009/0205245 | A1 | * | 8/2009 | Orchard | A01M 23/08 43/66 |
| 2011/0056117 | A1 | * | 3/2011 | Fritzboger | A01M 23/36 43/73 |
| 2012/0102820 | A1 | * | 5/2012 | Roberts | A01M 25/00 43/131 |
| 2014/0059919 | A1 | * | 3/2014 | Pupello | A01M 25/004 43/131 |
| 2017/0055516 | A1 | * | 3/2017 | Bittlinger | E02D 29/12 |
| 2017/0295773 | A1 | * | 10/2017 | Michalski | A01M 25/004 |
| 2018/0132475 | A1 | * | 5/2018 | Bittlinger | A01M 1/2011 |
| 2019/0075783 | A1 | * | 3/2019 | Buchstaller | A01M 25/004 |
| 2019/0364871 | A1 | * | 12/2019 | Hazell | A01M 1/2038 |

FOREIGN PATENT DOCUMENTS

| | | |
|---|---|---|
| DE | 102014102034 A1 | 2/2015 |
| FR | 2516747 A1 | 5/1983 |
| WO | 2009056817 A2 | 5/2009 |

* cited by examiner

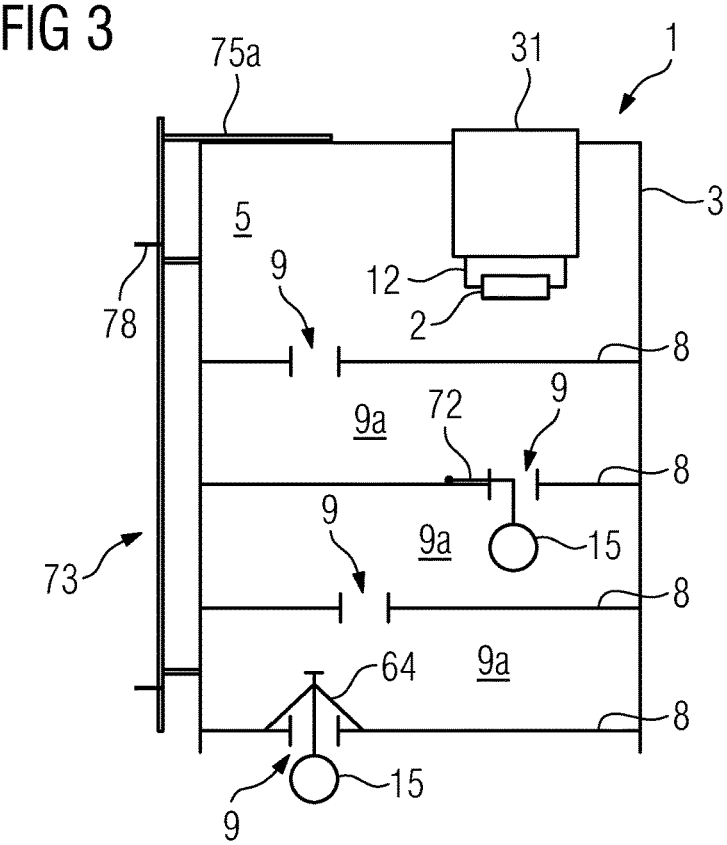
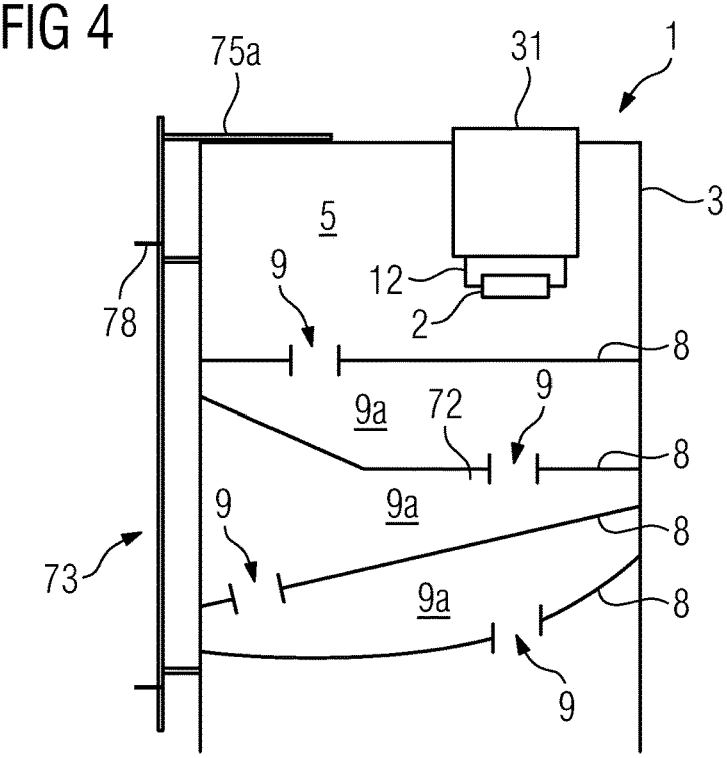

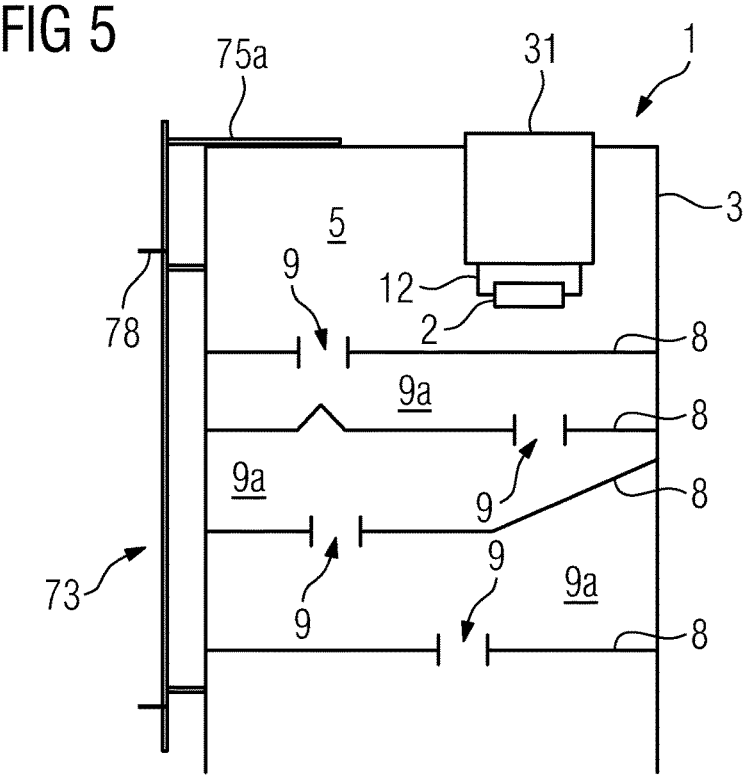
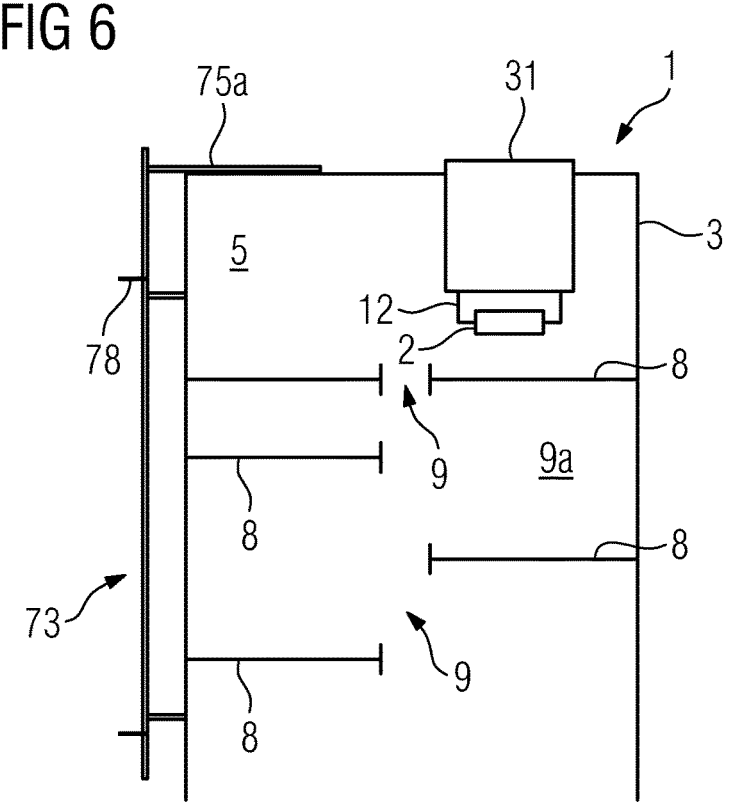

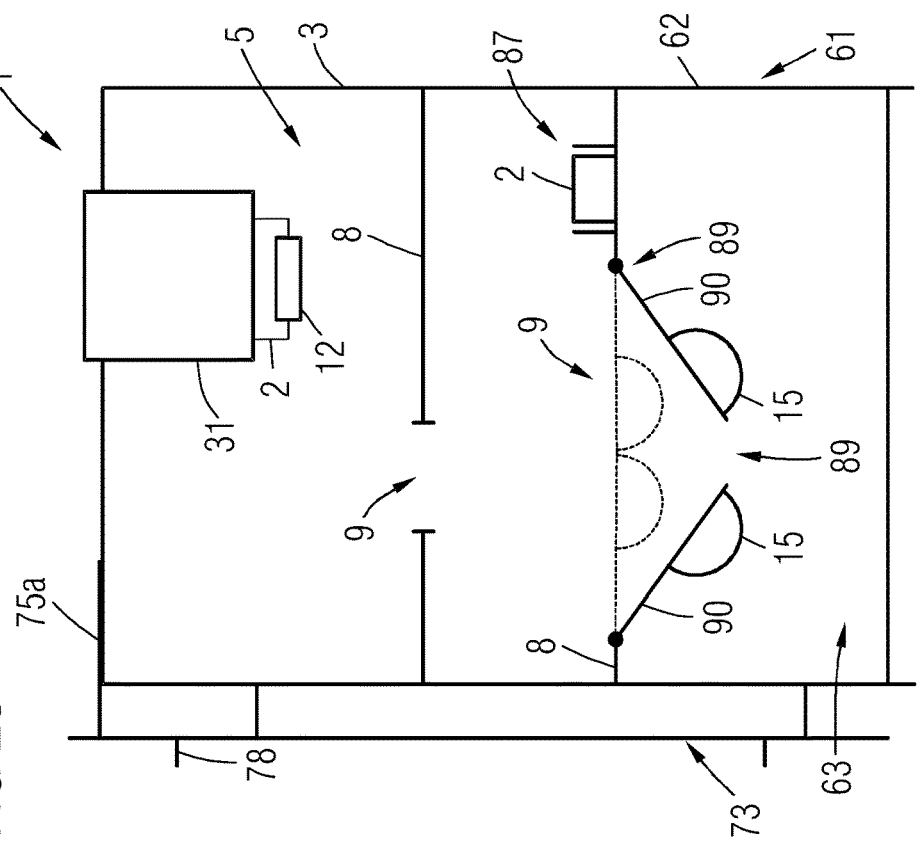
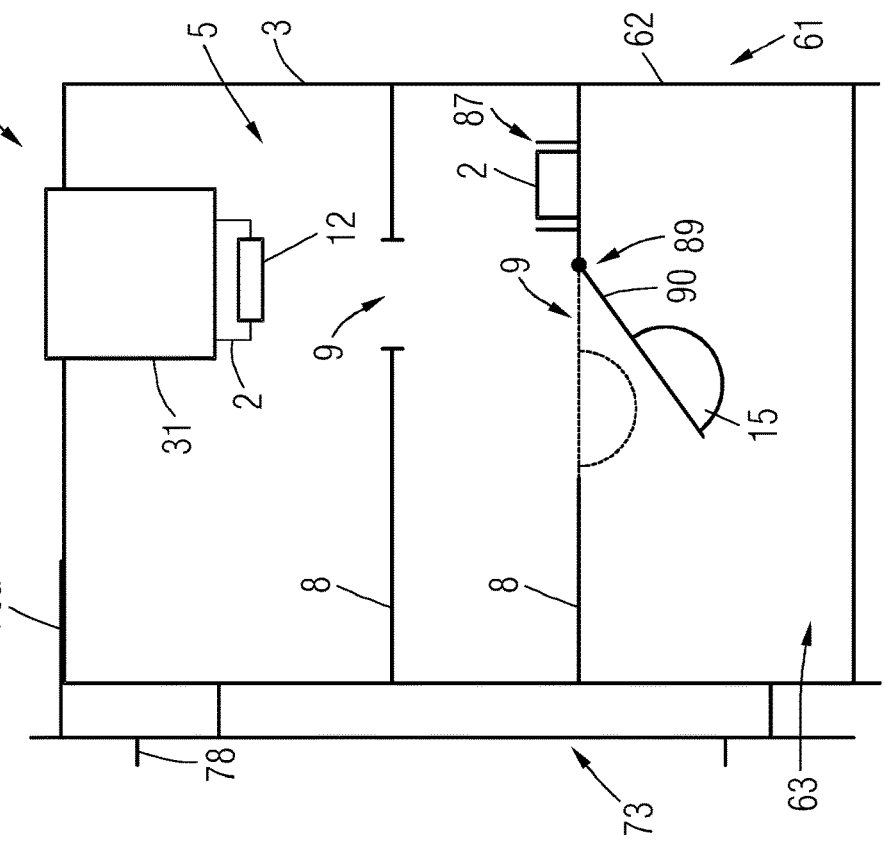

DEVICE FOR HOLDING BAIT FOR RODENTS

CROSS-REFERENCE TO RELATED APPLICATIONS

This application is a United States national stage entry of an International Application serial no. PCT/DE2015/000073 filed Feb. 18, 2015 which claims priority to German Patent Application serial no. 10 2015 000 348.8 filed Jan. 19, 2015. The contents of these applications are incorporated herein by reference in their entirety as if set forth verbatim.

The invention relates to an apparatus for holding bait, in particular bait for rodents.

Such apparatuses are provided in particular for pest control, i.e., in particular for controlling rodents, for example, mice and rats, which infest sewer drains and/or lines through which water flows, i.e., in particular sewers and/or drains for wastewater, rainwater or effluent and/or the corresponding manholes and/or line shafts, i.e., in general, in facilities carrying water, where such pests can cause substantial damage, for example, to sewer systems and other infrastructural systems and facilities. Corresponding apparatuses therefore contain bait, typically pest-specific bait, containing special toxins and/or ingredients, which bring about the death of the pests in various ways and/or prevent the pests from reproducing.

The toxins and/or active ingredients contained in the bait usually constitute a potential threat for man and nature, so that care must be taken to ensure that they do not enter and thereby contaminate water flowing through the respective sewers and/or manholes. However, traditional apparatuses, with large volumes of water and thus high water levels in the sewers and/or manholes, which is the case after a heavy rain, for example, do not offer sufficient protection against such contamination.

The object of the invention is therefore to provide an improved apparatus for holding bait, in particular bait for rodents.

This object is achieved by an apparatus of the type defined in the introduction, which is characterized according to the invention by a housing part that can be inserted into a manhole, in particular a sewer manhole or a cable duct manhole, at least one bait platform arranged in the housing part, delimiting at least one passage opening on the bait platform side, through which a rodent can gain access to bait arranged in the housing part.

The principle according to the invention relates to a specially designed apparatus for holding bait for pests, i.e., in particular bait for rodents, for example, mice and rats. The bait contains certain substances, typically pest-specific substances, for example, toxins and/or active ingredients, which cause the pests to die in various ways and/or prevent reproduction of the pests. The term pest is also used in the following; this is understood to include rodents in particular, for example, mice and rats.

The apparatus according to the invention comprises a housing part. The housing part can be inserted into a sewer and/or a manhole such as, for example, a sewer manhole and/or a cable duct manhole. Water and/or wastewater, respectively, is/are typically to be found in the sewer and/or manhole, respectively, or the sewer and/or manhole may have water and/or wastewater flowing through it at least temporarily. Only the term "manhole" is used in the following. This is understood to refer to part of a water-carrying device such as, for example, a sewer system for water, i.e., wastewater, rainwater, effluent and/or supply lines, etc.

To implement a stable and secure configuration of the housing part inserted into the manhole, it expediently has a fastening device by means of which it can be fastened onto a wall of the manhole and/or ladder equipment devices on the manhole side, such as, for example, climbing irons or crampons on the manhole side can be fastened on a wall of the manhole. The fastening device may include fastening elements in the form of a bolt, hook or profile, for example, to fasten the housing part and thus the apparatus as a whole on or in a wall of the manhole and/or corresponding climbing devices.

The housing part is typically made of a corrosion-resistant material such as a stainless steel (plate) and/or plastic. Different sections of the housing part may be made of different materials. In particular for the embodiment of the or one section of the housing part made of plastic, it is true that a transparent plastic material may be used here to ensure the required view into the housing part.

The housing part is typically, but not necessarily designed as a hollow cylinder, i.e., it typically delimits a cylindrical receiving space, in which certain components of the apparatus are or can be accommodated.

The housing part may be closed or closable, for example, on one end face via a cover element, so that a possibility of access to the receiving space on the housing-part side can be created by removing the cover element. The cover element may have a threaded section; the housing part may have an opposing threaded section, so that the cover element can be screwed onto the housing part.

At least one or more bait platform(s) as applicable, i.e. at least two, are arranged or formed within the housing part. Respective bait platforms each delimit at least one passage opening. Respective passage openings are sized so that a pest can past through them. Respective passage openings define a lower region below a respective bait platform and an upper region of a respective bait platform. The or a bait is typically arranged in a respective upper region. The or a bait can be arranged lying directly on the bait platform. Although conceivable in principle, not every bait platform must be provided with bait, in the possible case of a plurality of bait platforms. Alternatively or additionally, the or at least one bait can also be arranged on a bait-holding apparatus for holding bait. A bait held by a bait-holding apparatus must not be arranged lying directly on a corresponding bait platform.

To reach the bait arranged within the housing part, a pest must first enter the housing part. The housing part is therefore expediently designed having at least one passage through which the pest can enter the housing part. Naturally, a pest can also exit the housing part via a corresponding passage. A corresponding passage can alternatively or additionally also be formed on an optional, i.e. not necessarily present, closing body, to be specified further below. The passage enables access into a lower region, i.e. lying below the (bottom) bait platform, of the housing part. To reach the bait, the pest, which has entered the housing part, must subsequently reach the bait platform that has been provided with bait through at least one passage opening delimited on a bait-platform side. After biting on the bait, the pest can then move to the lower region of the housing part by passing through at least one passage opening delimited on a bait platform side, and can leave the apparatus through corresponding passages. It is of course also conceivable in principle for the or an additional passage to enable access to an upper region, i.e. lying above the (bottom) bait platform, of the housing part.

When water flows into and/or rises in the housing part, a counter-pressure develops in the housing part, opposing the inflowing and/or rising water and/or counteracting the inflow and/or rise of water, because of the given volume (internal volume) and the imperviousness of the housing part. This is the result of the fact that the air in the housing part is compressed due to the inflow and rise of water. The rise of water in the housing part thus becomes increasingly difficult because of the counterpressure that thus develops. In consideration of the housing part design comprising at least one bait platform, this means that such a high counterpressure can oppose the water rising in the housing part that the water can no longer rise under the given flow conditions. For the possible case of a housing part design comprising a plurality of bait platforms, a corresponding counterpressure means that such a high counterpressure can oppose the water rising in the housing part that the water can no longer rise under the given flow conditions. A principle is defined in any case, which counteracts the above-mentioned problems of contamination of water with substances such as toxins and/or active ingredients that are contained in the corresponding bait, in a simple and reliable manner.

In the possible cases of a plurality of bait platforms, respective bait platforms are typically arranged above or below each other. Depending on the geometry of the respective bait platforms, multiple bait platforms may be arranged in parallel in at least some sections. Typically an intermediate space, which defines an intermediate plane, is formed between two bait platforms arranged (directly) next to one another. The respective intermediate spaces need not be the same with respect to their shape, their volume, etc., but instead may be different. This is true of the exemplary case of more than two bait platforms and thus at least two corresponding intermediate spaces. The respective intermediate spaces communicate with one another through the respective passage openings delimited on the bait-platform side; there is thus the possibility of passage from a "bottom" bait platform up to a "top" bait platform.

Intermediate spaces formed between corresponding bait platforms can create a flow-based "calming," influencing the flow in general, of the water rising in the housing part. The water flowing into the housing part and rising in it must thus "travel" upward along the path here over several intermediate levels, which typically leads to a "calming" of the flow of the water. At least one bait platform can be provided in at least some sections with a surface structuring, for example, in the form of flow-influencing ribs and/or beads to influence the flow, in particular the type of flow and/or the velocity of flow of water flowing along these and/or rising in the housing part.

Due to the presence of a plurality of bait platforms or intermediate spaces, there is also the possibility of furnishing the housing part with a larger number of baits compared to a housing design comprising only one (single) bait platform, because baits can be arranged in principle in several levels. To this extent, the housing part can also be frequented by a greater number of pests by comparison. Furthermore, the mechanical stability, in particular the stiffness of the housing part can be increased by the presence of a plurality of bait platforms or intermediate spaces. The housing part can be additionally "stiffened" by the bait platforms arranged therein.

The respective passage openings delimited by the respective bait platforms may be arranged so that they are offset relative to one another. In general, at least one passage opening, which is delimited on the bait-platform side of a first bait platform, can be arranged so that it is offset from the at least one passage opening, which is delimited on the bait-platform side of another bait platform arranged directly or indirectly adjacent to the first bait platform. For example, a passage opening of a first bait platform may be designed in an edge region of the first bait platform and a passage opening in another bait platform next to the first bait platform may be designed in an edge region of the additional bait platform arranged oppositely. Due to the offset configuration of the respective passage openings, a "calming" or in general an influence on the flow of water thus rising in the housing part, for example, in a meandering form, is likewise possible. The offset configuration of the respective passage openings also facilitates the movement of pests between the respective intermediate spaces and/or intermediate planes.

At least one bait platform may be designed in at least some sections with a bait platform section running at an inclination or bent and/or curved relative to a horizontal plane or, insofar as it is present, relative to at least one additional bait platform arranged in particular next to it. Through the corresponding inclined and/or bent and/or curved profiles of a bait platform, an influence on the flow of water rising in the water part can also be implemented. Inclined and/or bent and/or curved profiles of corresponding bait platforms can also facilitate the ascent and/or descent of pests between the respective intermediate spaces and/or intermediate planes in the sense of ascending and/or descending ramps.

As an additional measure for influencing the flow of water rising in the housing part, at least one bait platform may be designed in at least some sections with openings and/or perforations passing through them. The respective openings in a bait platform designed like a hole (plate) structure in general can "dampen" the flow of rising water and can thus likewise "calm" it. The openings are present in addition to the respective passage openings and they differ in particular in their size, i.e., in particular in their diameter from the respective passage openings; these openings are small in comparison with the respective passage openings. Roundish openings, for example, can have a diameter between 50 µm and 3 mm. Of course various openings with different geometries may be present.

At least one bait platform may be designed to extend in at least some sections in a spiral or helical form through the housing part in at least some sections. A pest penetrating into the housing part can easily move inside the housing part to arrive at the bait, for example, by means of a bait platform designed in a spiral or helical form accordingly—similar to a spiral staircase. Spiral and/or helical bait platforms may also have an influence on the flow of water rising in the housing part. This embodiment can be particularly expedient for a housing part design comprising only one (single) bait platform, since a pest can be enabled to ascend and descend within the housing part only via one (single) corresponding spiral-shaped or helical bait platform. Of course, said embodiment can also be similarly expedient in connection with a housing part design comprising a plurality of bait platforms.

The device can comprise at least one closing body. The providing of a corresponding closing body is expressly optional and in no way required. The apparatus consequently generally comprises no corresponding closing body. Insofar as it is present, the at least one closing body can be mounted so that it can be moved relative to at least one bait platform, wherein the closing body is moved away from the respective bait platform in an open position, such that the respective at least one passage opening delimited on the bait-platform side is exposed, and in a closed position is moved toward the bait platform in such a way that the respective at least one passage opening delimited on the bait-platform side. The mounting of the closing body typically includes an undetachable arrangement of the closing body on the housing part or a bait platform.

In the open position, the closing body is moved away from the respective bait platform in such a way that the respective passage opening, which is delimited on the bait-platform side, is exposed. Consequently, a pest can pass through the passage opening in the open position of the closing body. In the closed position, the closing body seals or closes the respective passage opening delimited on the bait platform side, typically in a hermetically or fluid-tight manner. Accordingly, the region of the housing part above the respective passage opening in the closed position of the closing body is typically sealed and/or closed hermetically or in a fluid-tight manner. Accordingly, a pest cannot pass through the passage opening in the closed position of the closing body. In the closed position of the closing body, a penetration of water, e.g. due to high water or surge water, into a region of the housing part located above the respective bait platform is impossible. The movement of the closing body from the closed position into the open position can be induced in a variety of ways. This will be discussed in greater detail below.

A corresponding closing body may be mounted to be reversibly movable between the open position and the closed position. Consequently, a closing body, which is in the closed position, can change to the open position and vice versa on its own. Alternatively, a closing body may be mounted to be irreversibly movable between the open position and the closed position, such that it is held in the closed position, in particular releasably, by means of at least one closing-body-holding device. A closing body may then be held in the closed position by the closing-body-holding device. A closing body in the closed position thus cannot move into the open position on its own.

A closing-body-holding device may comprise at least one mechanical and/or magnetic holding means on the housing-part side and/or on the closing-body side, equipped for a mechanical and/or a magnetic holding of a closing body in the closed position. The mechanical and/or magnetic holding means on the housing-part side and/or on the closing-body side may interact with one another in such a way that a closing body is securely held in the closed position and cannot readily be released therefrom.

The or a mechanical holding means may include, for example, catch and/or snap elements, which implement a mechanical holding of a closing body in the closed position. The catch and/or snap elements may be, for example, protrusions and the corresponding recesses and/or undercuts. Depending on the structural design of the catch and/or snap elements, the holder implemented in this way may be releasable or not (without damage or destruction).

A magnetic holding means may include in particular permanently-magnetic magnet elements, for example, which implement a magnetic holder of a closing body in the closed position due to magnetic interaction. In this context, it is also conceivable, for example, for a magnet element on the housing-part side to be arranged in such a way that it exerts a magnetic force holding a closing body in the closed position on a magnet element on the closing-body side when the closing body approaches the closed position and/or is in the closed position. The magnetic force should not be so great that the closing body, which is in the open position, is moved into the closed position only because of this force. If a closing body is formed from a magnetic or magnetizable material, it may optionally be possible to omit magnet elements on the closing-body side. The housing part and/or a closing body may fundamentally include the corresponding magnet elements.

The mounting of a closing body, which is movable relative to a corresponding bait platform, can be implemented structurally by at least one guide section on the housing-part side and at least one guide element on the closing-body side, wherein the at least one guide section on the housing-part side interacts with the at least one guide element on the closing-body side to yield a movably-mounted guide of the closing body between the open position and the closed position and vice versa. In general, due to the interaction of the guide section(s) on the housing-part side with the guide element(s) on the closing-body side, this typically permits a linear guidance of a closing body. A guide section on the housing-part side may be formed on an inside or outside of the housing part. A guide section on the housing-part side may be designed, for example, as a guide rail receptacle; a guide element on the closing-body side may be designed, for example, as a guide rail or guide web.

With regard to the structural design of a corresponding closing body, it is preferable for it to have at least one cup-shaped or conical closing section, which, in the closed position of the closing body, is in sealing contact in some sections with the contact sections formed on the edges on the bait-platform side, delimit a respective passage opening, which is delimited on the bait-platform side. Due to the sealing contact of a closing body, i.e., corresponding counter-contact sections designed on the cup-shaped or conical closing section on the closing-body side, on contact sections designed on corresponding edges, delimiting the passage opening on the bait-platform side, a penetrating or rising of water is not (further) possible.

Consequently, the contact sections on the bait-platform side, formed on the edges delimiting a respective passage opening, are expediently provided with a sealing element, for example, a sealing ring, a sealing lip, etc., in at least some sections. Likewise, a closing section on the closing-body side, i.e., in particular corresponding counter-contact sections formed thereon, may be provided with a sealing element in at least some sections, for example, a sealing ring, a sealing lip, etc.

To facilitate a pets or rodent's access to a bait platform via a closing body, it can be provided that a closing body may inhibit or prevent slippage of the rodent from the closing body in at least some sections with at least one surface structuring and/or surface coating and/or surface layer offering a hold and/or confinement for a rodent entering the closing body. A corresponding surface structuring and/or surface coating and/or surface layer inhibits or prevents the rodent from slipping down from the closing body so it serves in the sense of "entry aid" and makes is easier for a rodent to gain access to a bait platform, access to the interior of the housing part in general. A corresponding surface structuring and/or surface and/or surface layer of course also conversely serves in a sense of an "exit assistance" for a rodent and thus also facilitates the rodent departing from a bait platform, in general its exit from the interior of the housing part.

The or at least one corresponding surface structuring, typically three-dimensional, offering a hold and/or confinement for a rodent entering the closing body may be formed, for example, by grooving and/or rib and/or bead structures in the surface of a closing body. A corresponding surface structuring may form rung-type or step-type structures in a surface section of a closing body. A certain roughening of the surface may also serve as a corresponding surface structuring. The or at least one surface coating offering a hold and/or confinement for a rodent entering a closing body may be formed by a rubbery coating, for example. In general, any coatings which improve the sticking of a rodent on a closing body, for example, based on natural or synthetic rubbers, silicones, etc. may be applied in at least some sections to the surface of a closing body. The or at least one surface layer may be formed, for example, by a rubbery surface layer fastened onto the surface of a closing body in at least some sections. A corresponding surface layer is to be fastened in a suitable manner to a closing body, to which end, all form-fitting and/or force-locking and/or physically-bonded types of fastening may be considered. Merely as an example, reference is made to clipping, gluing, screw connection, embossing, etc.

For the exemplary case of a cup-shaped and/or spherical-segment-shaped closing body, a corresponding surface structuring and/or surface coating and/or surface layer may be designed or arranged in at least some sections on a circular disk-shaped section of the spherical-segment-shaped closing body.

For implementation of the mounting of a closing body, which is movable relative to a bait platform, as described further above, it is conceivable for the closing body to be mounted to be movable relative to the bait platform by means of at least one clamp-type or bracket-type holding element, which is mounted movably, in particular pivotably, in or on the housing part, in particular on the bait platform. A corresponding holding element, to be referred to also as a holding clamp or a holding bracket, is typically fastened on the one hand, in particular on one end, to the housing part and/or the bait platform, and on the other hand, in particular at the other end, on the closing body. A certain path of movement, which the closing body rums through in movement from the open position into the closed position and vice versa, is defined by the connection of a closing body to the holding element, the connection of the holding element to the housing part and/or the bait platform as well as the geometric dimensions, i.e., in particular the shape of the holding element.

The bracket-type or clamp-type holding element may comprise at least two holding element sections running parallel or at an angle to one another, wherein at least one holding element section engages through the passage opening delimited on the bait-platform side, at least in the open position of a closing body. Corresponding holding element sections and thus the entire holding element may be bent, for example, in an L shape, i.e., having an (essentially) L-shaped geometric shape.

Another possible implementation of the movable mounting of a closing body may be achieved by means of a flap-valve device. A corresponding flap-valve device may comprise at least one flap-valve element, which is mounted so that it can move, preferably pivotably, relative to the bait platform, and is movable in an open position away from the bait platform, so that the at least one passage opening delimited on the bait-platform side is exposed and is moved toward the bait platform in a closed position, such that the at least one passage opening that is delimited on the bait-platform side is closed. The closing body here may be an integral component of the flap-valve device in the form of a corresponding flap-valve element. As an alternative, it is of course also possible to fasten a separate closing body on a corresponding flap-valve element.

A corresponding flap-valve device may also comprise multiple flap-valve elements, which are moved away from the bait platform in a respective open position, such that the at least one passage opening that is delimited on the bait-platform side is exposed, and are moved toward the bait platform in a respective closed position, such that the at least one passage opening that is delimited on the bait-platform side is jointly closed by the flap-valve elements.

Subsequently, exemplary embodiments of the apparatus are described, and on the basis thereof, it is explained in greater detail how a movement of a closing body from the open position into the closed position and vice versa can be induced. The example embodiments described below in this context can be combined with one another in any way.

One embodiment provides that a closing body is designed as a float or includes at least one float. A float is understood to be a body, which floats on the surface of water and does not sink. This can be accomplished structurally, for example, by means of a closing body having at least one cavity. The cavity is filled with air, for example. Alternatively or additionally, the closing body may also be manufactured from a low-density material, which then floats on a water surface, based on the difference in density, and does not sink. Such a material may be, for example, in particular a foamed plastic. Specifically the plastic may be, for example, foamed thermoplastics such as foamed polyethylene or foamed polystyrene, for example. Movement of the closing body from the open position into the closed position here would be induced automatically by an increase in resistance in the manhole accommodating the apparatus. Accordingly, a movement of the closing body from the closed position into the open position would be induced by a drop in the water level in the manhole accommodating the apparatus.

Another embodiment provides that the movement of a closing body from the open position into the closed position is induced by a drive device that is or can be coupled to the closing body. The drive device is equipped to move the closing body from the open position into the closed position and/or vice versa. With regard to the design and/or concept of such a drive device, two basically different but again combinable specific embodiments are conceivable.

A first embodiment of a corresponding drive device provides that said drive device is designed as a motorized drive device or at least includes one such drive device. Consequently, at least one motor drive device coupled to the closing body may be provided, this drive device being equipped to move the closing body from the open position into the closed position and/or vice versa. A motorized drive device may be an electric motor, for example. The coupling between a motorized drive device and the closing body may be implemented, for example, through suitable traction means, for example, in the form of belts or chains. In this embodiment, the closing body may of course also be designed as a float or may at least include a float.

A second embodiment of a corresponding drive device provides that said drive device is designed as a magnetic drive device or at least includes one such drive device. Consequently, at least one magnetic drive device that is or can be coupled to the closing body is provided; it is equipped to move the closing body from the open position into the closed position or vice versa. Again in this embodiment, the closing body may be designed as a float or may at least include such a float.

A magnetic drive device typically comprises at least one magnetizable and/or magnetic magnet element on the part of the housing part and on the part of the closing body. Both electromagnetic and permanently-magnetic magnet elements may be considered. A magnetizable magnet element may thus be, for example, an electromagnet, which exerts a magnetic attractive force when energized. A magnetic magnet element may be, for example, a permanent magnet having a static magnetic field. In any case, magnet elements on the housing-part side and on the closing-body side can interact with one another in such a way that a strong magnetic attractive force can be exerted, on the basis of which the closing body can be moved from the open position into the closed position.

In this context, different configurations are conceivable. For example, it is possible for at least one electromagnetic magnet element, which may be energized, if necessary, to be arranged on the housing-part side and, when energized, to interact with at least one permanently-magnetic magnet element on the closing-body side, in such a way that the closing body can be moved from the open position into the closed position because of magnetic attraction. The or a magnet element on the closing-body side may be arranged on an exposed surface of the closing body or integrated into the closing body. The closing body as such may of course also be manufactured from a magnetic or magnetizable material, such as, for example, ferritic steel or plastic filled with magnetic or magnetizable particles.

In principle, however, it is also possible to provide at least one electromagnetic magnet element on the closing-body side and at least one permanently-magnetic magnet element on the housing-part side.

Likewise, corresponding electromagnetic magnet elements may be provided both on the housing-part side and also on the closing-body side.

It is also conceivable to provide at least one permanently-magnetic magnet element on both the housing-part side and also the closing-body side, so that with sufficient proximity of the magnet element on the closing-body side to the magnet element on the housing-part side, the closing body is moved from the open position into the closed position based on magnetic attraction. Sufficient proximity can be achieved, for example, when a closing body designed as a float or comprising at least one such float is moved, starting from the open position by a certain amount in the direction of a bait platform due to high water, for example, i.e., into a position located between the open position and the closed position. In this embodiment, one must of course be sure that the magnetic attraction, i.e., interaction existing between the respective permanently-magnetic magnet elements is not so high that the closing body situated in the open position is moved into the closed position merely because of this.

Based on the embodiments of a motorized and/or electromagnetic drive device as described, it is conceivable that an assigned control unit is provided, by which the control of the operation of the drive device(s) takes place. The control unit is thus equipped to generate control information (control commands) controlling the operation of the motorized and/or electromagnetic drive device(s).

A corresponding control unit may additionally be equipped to generate the control information as a function of water level information describing the or a water level in the manhole accommodating the apparatus and said water level information supplied by a water-level detecting device for detecting the water level in the manhole accommodating the apparatus. Consequently, control of the operation of a motorized and/or electromagnetic drive device may take place as a function of the water level detected via a water-level-detecting device and mapped in water level information in the manhole accommodating the apparatus. Certain critical water levels which, on being reached, permit in principle penetration of water into the housing part and in particular into a region of the housing part in which a bait is arranged, can be taken into account by the control unit, so that the control unit promptly supplies corresponding control information to the motorized and/or electromagnetic drive device to prevent water from penetrating into the housing part and/or the region of the housing part in which a bait is arranged.

A corresponding water-level-detecting device may form a part of the apparatus. However, this is not absolutely essential and instead a corresponding control unit may also be equipped to communicate with at least one external water-level-detecting device, i.e., arranged at a different physical location from the apparatus. This may be in particular a water-level-detecting device situated downstream with respect to the position of the apparatus in the manhole, so that an imminent high water level can be detected promptly. The apparatus or, respectively, the control unit of course has suitable reception equipment for this purpose which permit an exchange of data and/or information with an external water-level-detecting device, in particular radio based, implemented by Bluetooth, WLAN, etc., for example.

The apparatus may also comprise a closed-position-detecting device for detecting the closed position of the closing body. The closed-position-detecting device typically arranged in the housing part is equipped to generate at least one acoustic and/or optical closed-position information item on detection of the closed position of a closing body and to output it via at least one output means. This makes it possible to detect that the closed position has been reached and to easily display this fact via acoustic and/or optical signals, which may be expedient in the case of service work or repair work. It is thus possible to display for the service or repair personnel the fact that a high water level has been reached or is being reached in the sewer, on the basis of which a closing body has been moved into the closed position or is still located in the closed position. Consequently, the closed-position-detecting device comprises a suitable sensor system for detecting the closed position of a closing body. The sensor system may be embodied optically, i.e., for example, by implementation of light barriers.

As mentioned, at least one bait is or may be arranged on a bait-holding unit for holding bait. For the case when the apparatus is equipped with such a bait-holding unit, it may be expedient if the apparatus also comprises a bite-detecting device for detection of a bite on the bait. The bite-detecting device, which is typically arranged in the housing part is equipped to generate at least one item of acoustic and/or optical bite information on detection of bait that has been bitten and/or a bite on the bait and to output it via at least one output means. This makes it possible to detect a bite on the bait by a pest and display this via acoustic and/or optical signals in a simple way, which in turn may be expedient in the case or service or repair work. It is thus possible to display for the service or repair personnel that fact that a bite on the bait has occurred and thus a check is necessary as to whether a new bait is to be inserted into the housing part. Consequently, the bite-detecting device comprises a suitable sensor system for detecting a bite on the bait. The sensor system may detect, for example, the weight of the bait arranged on a bait-holding unit, wherein bite-induced changes in weight, typically reductions in weight of the bait allow inferences regarding a bite on the bait. Likewise, the sensor system may detect bite-related forces, typically tensile forces which act on the bait and/or the bait-holding device and also allow inferences about a bite on the bait.

The bite-detecting device may generate different acoustic and/or optical signals as a function of the bite information, for example, based on the detection of the weight of the bait. The weight of a new bait that has not been bitten can be signaled, for example, with optical signals of a green color and/or with optical signals that are output continuously; the weight of a partially bitten bait can be signaled, for example, with optical signals of a yellow color and/or optical signals output at a first blinking frequency; if the bait has been completely eaten, this may be signaled, for example, by optical signals of a red color and/or with optical signals output at a higher second blinking frequency in comparison with the first blinking frequency. The same of course applies for the output of acoustic signals, wherein in particular the frequency and/or the rhythm of a tone and/or a tone sequence is variable as a function of the bite information, for example, based on detection of the weight of the bait. The same of course applies for the case when the bite-detecting device draws inferences regarding a bite on the bait, not based on weight but instead based on other measured variables.

An acoustic output means may be designed, for example, as a loudspeaker or may at least include such a one. An optical output means may be designed, for example, as a light-emitting diode, in particular in multiple colors or a display screen or may comprise at least such a one.

The or an output means may be arranged in or on the housing part, wherein it is arranged on an exposed exterior surface of the housing part or inside a receiving space delimited by the housing part. In particular for optical output means, it is true that if said means are arranged within the housing part, i.e., within a receptacle space of the housing part delimited by the housing part, then the housing part should be designed to be at least partially transparent in order to make the optical signals also recognizable from outside of the housing part.

The or an output means may also be integrated into an external mobile terminal. If the or an output means is integrated into an external mobile terminal, the closed-position-detecting device and/or the bite-detecting device may be equipped to communicate with the external mobile terminal and to transmit the closed-position information and/or the bite information to the external mobile terminal for output to the output means there. Service or operating personnel can also be informed about reaching the closed position of the closing body and/or about a bite on the bait, for example, even without having to enter the sewer system. The communication that is described is radio-based in particular, i.e., it is implemented, for example, by Bluetooth, WLAN, etc., which is why the closed-position-detecting device and/or the bite-detecting device comprise(s) corresponding radio-based transmission devices. An external mobile terminal may be, for example, a cell phone, a smartphone, a tablet, notebook, etc.

In view of the plurality of electrical and/or electronic components optionally to be arranged in the housing part, i.e., in particular corresponding control or detection devices, it may be expedient for at least one receiving chamber to be designed or arranged in the or a receiving space delimited by the housing part, electrical and/or electronic components of the apparatus, in particular control units and detection units being arranged or disposable in said receiving chamber. The receiving chamber thus offers protection for these components with respect to external influences, i.e., in particular climate and mechanical influences. The receiving chamber may be designed to be an integral part of the housing or as a separate part, which is to be inserted separately into the receiving space on the housing-part side. The receiving chamber may be closed or closable via a cover element, wherein this may also be the cover element on the housing-part side mentioned further above, so that a possibility of access to the receiving chamber can be created by removing the cover element.

The or a corresponding receiving chamber in which electrical and/or electronic components of the apparatus, in particular control units and detection units, are or can be arranged may have a receiving-chamber-base body but is cylinder-like and/or cylindrical and delimits a receiving chamber volume for receiving electrical and/or electronic components of the apparatus, said receiving-chamber-base body protruding into the receiving space on the housing-part side in at least some sections.

A corresponding receiving chamber is or can be fastened, expediently detachably (without damage or destruction), on the housing part. The receiving chamber may thus be arranged in or on the housing part and at a distance therefrom. The releasable fastening of the receiving chamber on the housing part is or can be designed, for example, by the interaction, in particular in a form-fitting manner, of at least one fastening section on the housing-part side with at least one fastening section on the receiving-chamber-base-body side. The receiving chamber and the housing part are thus equipped with at least one fastening section here, by means of whose interaction a stable and/or undetachable and likewise releasable fastening of the receiving chamber on the housing part can be implemented. An interaction of the respective fastening sections in a form-fitting manner in particular is to be understood in particular as an intermeshing or overlapping of corresponding fastening sections in at least some sections.

The receiving chamber may be arranged or disposable, mounted on the housing part, so that it is rotatable between a fastening position and a release position. In the fastened position, the at least one fastening section on the housing-part side and the at least one fastening section on the receiving-chamber-base-body side interact in a form-fitting manner in particular, so that the receiving chamber is releasably fastened on the housing part. In the release position, the at least one fastening section on the housing-part side and the at least one fastening section on the receiving-chamber-base-body side do not interact, so that the receiving chamber is releasable from the housing part. The fastening of the receiving chamber on the housing part can thus be established by rotational movements of the receiving chamber about an axis of rotation which typically coincides with the axis of symmetry or central axis of the receiving chamber, relative to the housing part and then canceled. The receiving chamber may thus be converted from the fastened position to the release position and vice versa by rotational movements relative to the housing part.

The or at least one fastening section on the housing-part side may be designed, for example, as a ring-disk element or ring-segment disk element protruding radially away from a cylinder-type section of the housing part, having at least one shoulder-type fastening protrusion, protruding axially away therefrom. The or at least one fastening section on the receiving-chamber-base-body side may be designed as a ring-disk element or ring-segment disk element protruding radially from a cylinder-type shoulder on the receiving-chamber-base body, having an axially-protruding shoulder-type fastening protrusion corresponding to the fastening protrusion formed on the fastening section on the housing-part side, i.e., in particular designed and/or aligned to be opposite.

To implement corresponding rotational movements of the receiving chamber, the receiving chamber can have at least one tool working region for form-fitting engagement of a tool in the region of an upper exposed cover section, rotational movements being transferrable to the receiving chamber by means of said tool to convert the receiving chamber from the fastened position to the release position and vice versa. Due to the configuration and/or design of at least one corresponding tool working region in the region of an upper exposed cover section of the receiving chamber, the tool attack region is always accessible (from above). The geometric design of the tool working region is such that a tool, for example, a T-shaped tool, can act on it in a form-fitting manner, so that rotational movements of the tool can be transferred to the receiving chamber.

The tool working region is readily accessible, i.e., in particular from above, in particular also in the condition of the apparatus, in which it is properly used in a manhole. Due to suitable shaping and dimensioning of a corresponding tool, it is not absolutely necessary for a user to climb down into the manhole to transfer the receiving chamber from the fastened positioning to the release position or vice versa through corresponding rotational movements. The receiving chamber may thus be released from the housing part from outside of the manhole and removed from the manhole, if necessary. This may be done for inspection purposes, for example, to ascertain whether there has been a bite on the bait, so that inspections may be performed in a substantially simplified and thus substantially more prompt manner.

In particular when the or a bait is held via a bait-holding device, which is designed or arranged on the receiving chamber for holding bait, the receiving chamber together with the bait-holding device and the bait held thereon may be removed from the manhole without entering the manhole, any bite on the bait may be detected, the or a bait may be exchanged or replaced, if necessary, and the receiving chamber together with the bait-holding device and the bait held thereon can be reintroduced into the manhole and fastened to the housing part.

It is apparent from the preceding paragraph that the or, in general, a bait-holding device is expediently designed or arranged for holding at least one bait on the receiving chamber. The bait-holding device is designed or arranged in particular on a section of the receiving chamber protruding into the receiving space on the housing-part side.

On or in the or a corresponding receiving chamber, at least one, in particular optical, monitoring device may be designed or arranged for monitoring at least one part of the receiving space delimited by the housing part. In general, the monitoring device is designed or arranged on or in the receiving chamber, so that the most extensive possible monitoring of the receiving space delimited by the housing part can be implemented. The monitoring device typically includes a suitable, in particular optical, sensor system for monitoring at least one portion of the receiving space delimited by the housing part. The monitoring device may thus be designed as an infrared sensor system and/or camera or may comprise at least one infrared sensor system and/or camera. The monitoring device may of course also be embodied in a different way in principle. For example, implementation of a monitoring device in the form of a video camera or the like would also be conceivable.

Regardless of the specific embodiment of the, or in general, a corresponding monitoring device, it is thus possible to detect and evaluate all processes in the or a region of the receiving space delimited by the housing part. In particular, pest-related processes can be detected quantitatively and/or qualitatively and evaluated and/or assessed. Processes of particular interest to be monitored quantitatively and/or qualitatively include, for example, ingresses of pests into the receiving space, egresses of pests out of the receiving space, the behavior, in particular the biting and/or movement behavior, of any pests entering the receiving space, in the receiving space, etc. In general, frequenting of the receiving space per unit of time can be detected qualitatively and evaluated and/or assessed. Since monitoring information and/or data detected by the monitoring device can of course be transmitted over a suitable, in particular radio-based, communication link to an external terminal, in particular a mobile terminal on the user side, a "monitoring" of all processes in the receiving space of the housing part delimited by the housing part, can be implemented by means of a corresponding monitoring device without the requirement of entering into the manhole and/or into the sewer system. The communication is radio-based in particular, i.e., implemented via Bluetooth, WLAN, etc., which is why the monitoring device comprises a corresponding radio-based transmission device. An external, in particular mobile, terminal may be, in turn, a cell phone, a smartphone, a tablet, a notebook, etc., for example.

The or in general a monitoring device may be supplied with electric power via an electric energy storage system designed or arranged in the receiving chamber, rechargeable in particular. As a corresponding electric energy storage system, for example, an electrochemical and/or galvanic energy storage system in the form of a battery, in particular rechargeable, may be considered. An inductive rechargeable energy storage mechanism, i.e., rechargeable by means of electromagnetic induction, is also possible. In principle the electric power supply of a corresponding monitoring device can also be implemented via a hard-wired connection thereof to a power supply network.

The situation is also similar for the electric power supply of other electrical and/or electronic components of the apparatus designed or arranged in a corresponding receiving chamber.

The apparatus may comprise at least one water-surge-protection element for protecting against penetration of water into the or a receiving space delimited by the housing part, in particular into an upper region of the receiving space situated above the passage opening delimited on the bait-platform side, in the case of a water level rising like a surge, i.e., suddenly in the manhole in which the housing part is inserted or to be inserted. The water-surge-protection element is typically arranged beneath the bottom bait platform. The water-surge-protection element may be arranged inside or outside the housing part in at least some sections.

A corresponding water-surge-protection element typically has a base body, which delimits at least one water-surge-receiving volume for receiving a certain amount of water flowing in the or a manhole. The base body of the water-surge-protection element may be designed to be of a cylinder-type and/or cylindrical, for example. Polygonal in particular rectangular base shapes are also conceivable. Insofar as it is present, a closing body can be mounted to be movable in at least some sections inside the base body of the water-surge-protection element in such a way that it is moved from the open position into the closed position with an increase in the water level entering into the at least one water-surge-receiving volume. The closing body is or comprises expediently, but not necessarily a float, in view of the above discussion, in conjunction with corresponding drive devices that are or can be coupled to a closing body.

The base body of the surge protection element may comprise a bottom surface having at least one surge-water-inlet opening in the region of its one side facing away from the bait platform, that is, typically the bottom. Insofar as it is present, a closing body may be arranged in at least some sections in the surge-water-inlet opening in the open position. With a rise in the water level in the manhole, the closing body, which is designed in particular as a float is lifted up from the surge-water-inlet opening, so that water can enter the water-surge-receiving volume until the closing body is finally, as described, moved from the open position to the closed position due to the rise in the water level in the water-surge-receiving volume. It is of course also conceivable for the base body of the surge water protection element to be completely open in the region of its side facing away from the bait platform. Insofar as it is present, a closing body can in this case be intended to be held via a suitable holder.

The base body of the surge water protection element may have a number of web-type feet, for example, which serve to mount the base body, optionally also the housing part arranged thereon plus the components of the apparatus arranged therein or fastened therein.

It is fundamentally true that the housing part may be provided with reinforcing structures to increase the mechanical stability of the housing part. Corresponding reinforcing structures may be designed, for example, in the form of rings or ribs. Corresponding reinforcing structures may be available as separate components, which are to be attached to the housing part accordingly, and/or connected to it or designed to be integral with the housing part.

A fastening device, already explained above, by means of which the housing part can be fastened, in particular releasably, on a wall of a sewer system, in particular a manhole, may constitute a particularly expedient component of the apparatus. A corresponding fastening device may comprise at least one first fastening element, which extends around the housing part on the outside circumference side, in particular an annular-shaped first fastening element and at least one second fastening element for fastening the first fastening element on the wall of a sewer system. Thus, by means of a corresponding fastening device, stable fastening of the housing part on a wall of a sewer system and/or a manhole is made possible, in particular being stable with regard to forces acting on the housing part due to high water or a water surge. The fastening of the second fastening element on the wall of the sewer system and/or of a manhole may be implemented, for example, by means of fastening bolts and/or screws passing through horizontal and/or vertical holes, optionally furnished with a thread, originating from the second fastening element or implemented on the part of the second fastening element. The fastening bolts and/or screws can be anchored in a stable manner in the wall of a sewer system and/or a manhole, for example, by masonry or screws.

All the components of the fastening device are expediently formed from or comprise one or more mechanically stable and corrosion-resistant materials, such as stainless steel and/or material structures. As additionally found, a corresponding fastening device can also ensure buoyancy protection for the housing part.

It is true in general that the fastening device may be designed in one or more parts. The first and second fastening elements, i.e., in general at least one additional fastening element may thus be formed in one piece with one another or formed in multiple pieces and fastened to one another accordingly. For fastening the respective fastening elements to one another, fundamentally all releasable or unreleasable (without damage and/or destruction), form-fitting and/or force-locking and/or physically bonded types of fastening may be considered.

To implement a buoyancy protection, the second fastening element may comprise at least one fastening-element section, which extends over the housing part on the top side, forming a buoyancy protection and extending beyond it in at least some sections. The housing part is thus protected against buoyancy forces due to high water and/or a water surge and is fastened in its positioning, in particular vertically, in a fixed position in or on the sewer system wall. In other words, the fastening-element section extending over the housing part at the side can absorb the buoyancy forces due to high water and/or a water surge.

It is of course also possible to provide multiple corresponding fastening-element sections. Thus, for example, at least two fastening-element sections running at an angle to one another, preferably in a V shape, may be present. A fastening-element section may fundamentally have any geometric shape. Merely as an example, reference is made to the leg-type and/or strut-type fastening-element sections.

Corresponding fastening-element sections may be releasable, fastenable or fastened to the exposed top side of the housing part, in particular in a form-fitting manner (without damage and/or destruction). The fastening thus takes place in particular by a form-fitting connection, i.e., via the form-fitting interaction of form-fitting elements on the part of the fastening-element sections with corresponding form-fitting elements on the part of the housing part. Form-fitting elements designed on the respective fastening-element sections may be designed, for example, as a recess or as a breakthrough; for example, form-fitting elements designed on the housing part may be formed by protrusions, in particular vertically, which engaging in or through corresponding recesses and/or passages in the mutually fastened state. A mixed or inverted configuration of corresponding recesses and/or breakthroughs and protrusions is of course also possible.

The or at least one corresponding fastening-element section may be releasably or unreleasably fastenable or fastened as a separate component on a profile-type base body of the second fastening element in a form-fitting and/or force-locking and/or physically-bonded manner (without damage and/or destruction). Merely as an example in this context, reference is made to a clamped, screwed or welded fastening. It is also conceivable for the or at least one corresponding fastening-element section to be designed in one piece with the or a profile-type base body of the second fastening element.

The or at least a fastening-element section may be designed in at least some sections with at least one, in particular cross-section-reducing reinforcing structure to increase the mechanical stability of the fastening-element section. The material thickness and thus the weight of the fastening device may be reduced in this way without sacrificing the mechanical stability. Corresponding reinforcing structures may be formed, for example, by ribs, beads, etc.

As an alternative to fastening the housing part by means of a corresponding fastening device, it is also conceivable for the housing part to be braced and thereby fastened by means of a tensioning device (directly) against the walls of a sewer system and/or of a manhole. The tensioning device may comprise multiple tension elements, typically arranged in an equidistant distribution, protruding radially away from the housing part, bracing the latter against the corresponding walls.

As a further alternative to fastening of the housing part by means of a corresponding fastening device, it is conceivable to provide at least one guide device for movable, in particular linear, guidance of the housing part inserted into a manhole along and/or relative to a wall of the manhole. The housing part here is thus not fastened in a fixed position on a wall of the manhole but instead is guided movably, in particular linearly, along and/or relative to a wall of the manhole by means of a corresponding guide device. By means of such a guide device, it is thus possible that the housing part inserted into a manhole, in addition to components of the apparatus arranged therein and/or thereon, is guided movably, in particularly linearly, moving within the manhole. Movements of the housing part are typically made along an axis of movement running vertically, in particularly linearly, i.e., along an axis of symmetry or a central axis of the manhole, for example. The housing part is guided movably, secured against tilting in the manhole by means of the guide device, so that the guide device prevents tilting of the housing part in the manhole.

In addition, various exemplary embodiments of corresponding guide devices are described, differing in particular in the functional and structural embodiments of the respective guide elements belonging to a respective guide device.

A corresponding guide device may comprise, for example, at least one, typically multiple, wheel-type or roller-type guide elements, over which the housing part is or can be guided movably and rolling on the wall of the manhole. Corresponding wheel-type or roller-type guide elements may be in direct contact with the wall of the manhole, so that no special measures are necessary to implement the movable guidance of the housing part on the (manhole) wall side. In the case of multiple wheel-type or roller-type guide elements, these are typically arranged or designed in an equidistant distribution on or around the housing part. The corresponding wheel-type or roller-type guide elements may be wheels or rollers, for example. In general, any guide elements that enable a corresponding rolling along a wall of a manhole may be considered.

Corresponding wheel-type or roller-type guide elements may be mounted on a holding device designed or arranged on the housing part. The wheel-type or roller-type guide elements may be braced or braceable against the wall of the manhole by means of the holding device, in particular with a tensioning force acting upon it. Due to such a holding and bracing function, secure vertical positioning of the housing part in a manhole is possible. The tensioning force is typically selected so that uncontrolled sinking of the housing part is prevented, vertical movements of the housing part in particular in the direction of a manhole cover and/or in the direction of an upper manhole opening are nevertheless made possible. Movements of the housing part in the direction of a manhole cover and/or in the direction of an upper manhole opening may be caused in particular by buoyancy forces due to a water surge, for example.

A corresponding holding device may comprise at least one mounted on the housing part to be pivotable or foldable, i.e., designed or arranged there, the holding arm being foldable or pivotable against a wall of a manhole. The holding arm may be coupled to at least one tension element, in particular a spring element, for example, in the form of a compression spring, a tensioning force, in particular a spring force bracing the guide element against the wall of the manhole being exerted or exertable on the holding arm by means of said tension element. Corresponding tension elements are typically arranged or formed between the housing part and a holding arm. The housing part can be inserted into multiple manholes having different diameters and braced (at an angle) against the manhole walls by means of a holding device having such a design.

Alternatively or additionally, a corresponding holding device may comprise at least one holding arm that can be lengthened, in particular like a telescope, being extendable radially (with respect to the axis of symmetry or the central axis of the housing part or of the respective manhole) toward a wall of a manhole. The holding arm may be coupled to at least one tension element, in particular a spring element, for example, in the form of a compression spring, a tensioning force, in particular a spring force bracing the guide element against the wall of the manhole being exerted or exertable on the holding arm by means of said tension element. The housing part can be inserted into multiple manholes having different diameters by means of a holding device designed in this way and can be braced (radially) against the manhole walls.

A corresponding guide device may also comprise at least one linear guide element on the housing-part side, in particular in the form of a gearwheel or toothed rack, and at least one corresponding linear guide element, which interacts with the former and is in the form of a gearwheel or toothed rack on the (manhole) wall side, by means of which the housing part is or can be guided, so that it is linearly movable on the wall of the manhole. In this case, the guide device thus also comprises guide elements on the wall side it the form of corresponding linear guide elements, in particular of a gearwheel or toothed rack type. Corresponding linear guide elements on the housing-part side and the wall side are typically in mechanical engagement and/or a mechanical operative connection, i.e., they interact to form a corresponding linear guide. In addition to linear guide elements of the toothed-rod type or gearwheel type, any linear guide elements on the housing-part side as well as on the wall side may be considered, if they permit a corresponding linear guidance of a housing part relative to a manhole wall.

A corresponding guide device may comprise at least one drive device, in particular a motorized drive device, which is or can be coupled to at least one guide element and is equipped to transfer a drive force inducing a guide element to a unidirectional or bidirectional drive movement to the at least one guide element. A corresponding drive device may be designed or arranged in or on the housing part. Alternatively or additionally, a corresponding drive device may also be integrated into or onto a corresponding guide element, for example, a wheel-type or roller-type guide element or designed or arranged on a gearwheel. A corresponding drive device may be an electric motor, for example. The power supply to the electric motor may be provided like the power supply to other electrical and/or electronic components of the apparatus.

A corresponding guide device may also comprise at least one profile-type or rod-type guide element that is or can be fastened in a manhole and is arranged on the housing part or passes through it, in particular axially. The housing part here is also guided movably, in particular linearly in relation to the profile-type or rod-type guide element. This typically also includes fastening the housing part on the profile-type or rod-type guide element, which is in turn fastened on the manhole side, i.e., for example, being bolted or walled into it. The profile-type or rod-type guide element need not necessarily be in direct contact with a manhole wall but instead may be designed or arranged centrally, for example, within the manhole. A profile-type or rod-type guide element passing through a housing part, typically axially, does not obstruct the function of the apparatus described further above, i.e., in particular also the movement of an optional closing body.

To implement or support movements of the housing part in the manhole, at least one float may be designed or arranged on the housing part. Insofar as a closing body is present, the positioning of corresponding floats is typically above the closing body so that rising water in the manhole does not reach a float on the housing-part side until the float is already in the closed position. As explained further above in conjunction with the closing body, a float is to be understood to be a body, which floats on a water surface and does not sink. It is possible to arrange separate floats on the housing part or to design the housing part already with integrated floats. This may be implemented structurally, for example, through a housing part wall, which defines or has at least one cavity. The cavity is filled with air, for example. Alternatively or additionally, a housing part wall may also be manufactured from a low-density material, which then floats on the water surface and does not sink due to the difference in density. Such a material may be, for example, plastic, in particular a foamed plastic. Specifically the plastic may be, for example, foamed thermoplastics such as foamed polyethylene or foamed polystyrene (Styropor), for example. An upward movement of the housing part would be induced here by a rise in the water level in the manhole accommodating the apparatus. Accordingly, a downward movement of the housing part would be induced by a falling water level in the manhole accommodating the apparatus. Corresponding movements of the housing part may of course be (jointly) controlled by means of drive devices, if such are present.

In particular in in this context, the possibility of suspending the housing part in the manhole, i.e., on a wall of the manhole, for example, in the manner of a hanging lamp is also conceivable. In this case a suitable hanging fixture is to be provided, by means of which the housing part can be hung on a wall, in particular one oriented or running horizontal.

The invention also relates to a manhole, in general a shaft-type construction or a shaft-type construction section comprising at least one apparatus as described. A corresponding manhole may be a sewer manhole or a cable duct manhole in particular. With regard to the manhole, all statements made in conjunction with the apparatus are applicable similarly.

Additional advantages, features and details of the invention are derived from the embodiment described below as well as on the basis of the drawings. They show:

FIGS. 1-28 each show a schematic diagram of an apparatus for holding bait according to an embodiment of the invention.

FIGS. 1-10 each show a schematic diagram of an apparatus 1 according to an embodiment of the invention in a sectioned schematic diagram.

The apparatus 1 serves to hold a bait 2. The bait 2 contains substances, i.e., in particular toxins and active ingredients which cause death of pests and/or prevent reproduction of pests. The apparatus 1 comprises a housing part 3. The housing part 3 is inserted into a sewer system 4, i.e., a sewer drain and/or a sewer manhole, for example. The housing part 3 is fastened by means of a fastening device on the housing-part side, which is not shown in greater detail in FIG. 1, by means of which the housing part 3 is fastened, in particular releasably, on a wall of the sewer system 4. The fastening device may comprise fastening elements designed in the form of hooks or profiles, so that the housing part 3 can be fastened in the wall of the sewer system 4 or corresponding climbing devices (not shown) such as iron ladders on the sewer-system side.

The housing part 3 is manufactured from a corrosion-resistant material such as a steel plate and (essentially) as a hollow cylindrical body, i.e., the housing part 3 delimits an (essentially) cylindrical receiving space 5.

As is evident based on the embodiments shown in FIGS. 7-10, a cover element 6 can be provided in the region of an upper end face of the housing part 3. The housing part 3 can thus be closable on the end face by means of a cover element 6. The possibility of access to the receiving space 5 can be created by removing the cover element 6. The cover element 6 can have a threaded section (not shown); the housing part 3 has an opposing threaded section (also not shown), so that the cover element 6 can be screwed to the housing part 3. A sealing element 7, which permits sealing of the housing part 3 in the region of the upper end face, can be arranged between the cover element 6 and the housing part 3.

In the embodiment according to FIG. 1, a typically annular bait platform 8 is arranged or formed in the receiving space 5 on the housing-part side. In the embodiments according to the other figures, a plurality of typically annular bait platforms 8 are arranged or formed in the receiving space 5 on the housing-part side. Respective bait platforms 8 each delimit a passage opening 9, typically circular. A passage opening 9 thus defines an upper region of the receiving space 5 situated above the latter and a lower region 5*b* of the receiving space 5 situated below it. In the embodiments shown in FIGS. 7-10, respective bait platforms 8 are structurally tied to the housing part 3 by means of inside walls 11, which are offset radially toward the inside with respect to the outside wall 10 of the housing part 3.

The bait 2 can be arranged in the upper region of the receiving space 5. A bait-holding device 12 for holding the bait 2 is provided for this purpose, on which the bait 2 is held. In principle, however, the or an additional bait 2 can also be arranged lying directly on a bait platform 8.

Irrespective of the number of respective bait platforms 8, when water flows into and/or rises in the housing part 3, a counter-pressure develops in the housing part 3, opposing the inflowing and/or rising water and/or counteracting the inflow and/or rise of water, because of the given volume (internal volume) and the imperviousness of the housing part 3. This is the result of the fact that the air in the housing part 3 is compressed due to the inflow and rise of water. The rise of water in the housing part 3 thus becomes increasingly difficult because of the counterpressure that thus develops. This defines a principle, which counteracts the contamination of water with substances such as toxins and/or active ingredients that are contained in the corresponding baits 2. In consideration of the housing part design comprising a plurality of bait platforms 8, this means that such a high counterpressure can oppose the water rising in the housing part 3 upon reaching a certain bait platform 8 that the water can no longer rise under the given flow conditions in the housing part 3.

In housing part designs comprising a plurality of bait platforms 8, respective bait platforms 8 are arranged above or below each other. Depending on the geometry of the respective bait platforms 8, a plurality of bait platforms 8 may be arranged in parallel in at least some sections (see particularly FIGS. 2-6). An intermediate space 9*a* defining an intermediate plane is formed between two (directly) adjacent bait platforms 8. The respective intermediate spaces 9*a* need not be the same with respect to their shape, their volume, etc., but instead may be different. This is true of the exemplary case of more than two bait platforms 8 and thus at least two corresponding intermediate spaces 9a. The respective intermediate spaces 9a communicate with one another through the respective passage openings 9 delimited on the bait-platform side; there is thus the possibility of passage from a "bottom" or "lower-most" bait platform up to a "top" or "upper-most" bait platform.

Corresponding bait platforms 8 or intermediate spaces 9a formed between corresponding bait platforms can create a flow-based "calming," influencing the flow in general, of the water rising in the housing part 3. The water flowing into the housing part 3 and rising in it must thus "travel" upward along the path over several intermediate levels, which typically leads to a "calming" of the flow of the water. The respective bait platforms 8 may also be provided in at least some sections with a surface structuring (not shown), for example, in the form of flow-influencing ribs and/or beads, which influence the flow, in particular the type of flow and/or the velocity of flow of water flowing along this and/or water rising in the housing part 3.

Figure 2:
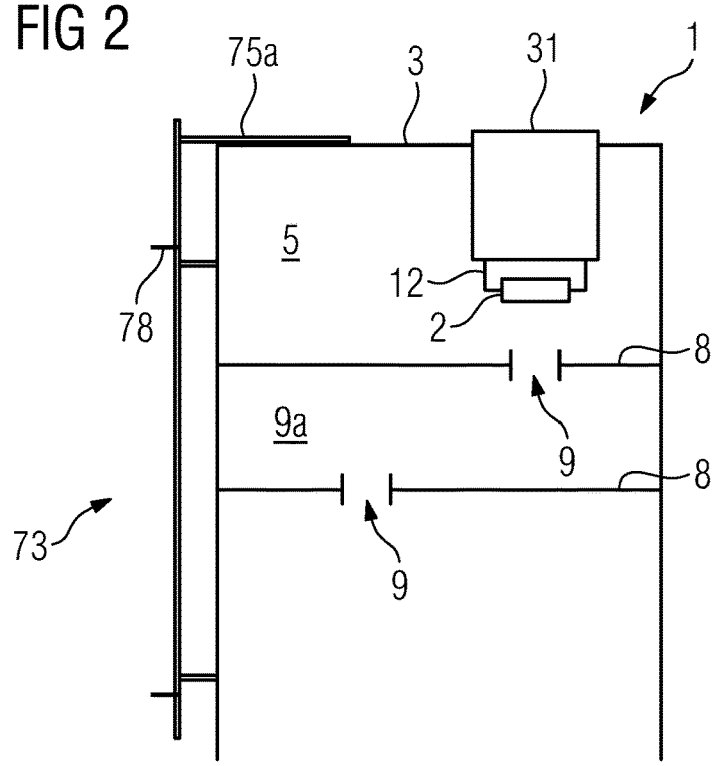

Particularly based on the embodiments shown in FIGS. 2-6, it is evident that passage openings 9 delimited by respective bait platforms 8 can be arranged offset relative to each other. As can be seen in FIG. 2, a passage opening 9 of a first bait platform 8 may be designed in an edge region of the first bait platform 8 and a passage opening 9 of another bait platform 8 next to the first bait platform 8 may be designed in an edge region of the additional bait platform 8 arranged oppositely. Due to the offset configuration of the respective passage openings, a "calming" or in general an influence on the flow of water rising in the housing part 3, for example, in a meandering form, is likewise possible. The offset configuration of the respective passage openings 9 can also facilitate the movement of pests between the respective intermediate spaces and/or intermediate planes.

Based on the embodiments according to FIGS. 4 and 5, it is evident that at least one bait platform 8 may be designed in at least some sections with a bait platform section running at an inclination or bent and/or curved relative to at least one additional bait platform 8 arranged in particular next to it. Likewise, an influence on the flow of water rising in the housing part 3 can be implemented through corresponding inclined and/or bent and/or curved profiles of bait platforms 8. Inclined and/or bent and/or curved profiles of bait platforms 8 can also facilitate the ascent and/or descent of pests between the respective intermediate spaces and/or intermediate planes 9a in the sense of ascending and/or descending ramps.

As an additional measure for influencing the flow of water rising in the housing part, at least one bait platform may be designed in at least some sections with openings and/or perforations (not shown separately) passing through them. The respective openings in a bait platform 8 designed like a hole (plate) structure in general can "dampen" the flow of rising water and can thus likewise "calm" it. The openings are present in addition to the respective passage openings and they differ in particular in their size, i.e., in particular in their diameter from the respective passage openings 9; these openings are small in comparison with the respective passage openings 9. Roundish openings, for example, can have a diameter between 50 μm and 3 mm.

FIG. 6 shows an embodiment having a bait platform 8 that is designed to extend in at least some sections in a spiral or helical form through the housing part 3. Through a corresponding spiral or helical design of the bait platform 8 (like a spiral staircase) a pest penetrating into the housing part 3 can easily move within the housing part 3, for example, to arrive at a bait 2. A spiral and/or helical bait platform 8 may also have an influence on the flow of water rising in the housing part 3. A spiral and/or helical bait platform 8 is also indicated by a dashed line in the embodiment according to FIG. 1, showing a housing part design comprising only one (single) bait platform 8. A spiral and/or helical bait platform 8 can also be expedient for a housing part design comprising only one (single) bait platform 8, since a pest can be enabled to ascend and descend within the housing part 3 only via one (single) corresponding spiral-shaped or helical bait platform.

The optional possibility that the housing part 3 can be equipped with a closing body 15 is shown based on the embodiment shown in FIG. 3. The consequently optional closing body 15 is movably mounted between an open position and a closed position. The more detailed purpose and functionality of the closing body 15 is explained in the following, particularly with reference to the embodiments according to FIGS. 7-10.

In the embodiments according to FIGS. 7-10, guide sections 13 on the housing-part side in the form of elongated guide receptacles are formed between the outside wall 10 of the housing part 3 and the inside walls 11, which are offset radially toward the inside. The guide sections 13 on the housing-part side interact with guide elements 14 corresponding to them in the form of elongated guide webs of a closing body 15. A linear guide and thus a movable mounting of the closing body 15 are implemented due to the interaction of the guide sections 13 on the housing-part side with the guide elements 14 on the closing-body side, making it possible to move the closing body 15 relative to the bait platform 8. The mounting of the closing body 15 includes an undetachable configuration and/or connection of the closing body 15 on and/or to the housing part 3.

The movable mounting of the closing body 15 enables an open position and a closed position of the closing body 15. The closing body 15 is thus particularly movably mounted or guided or can be moved between an open position and a closed position as well as optionally vice versa relative to the bait platform 9.

Figure 7:
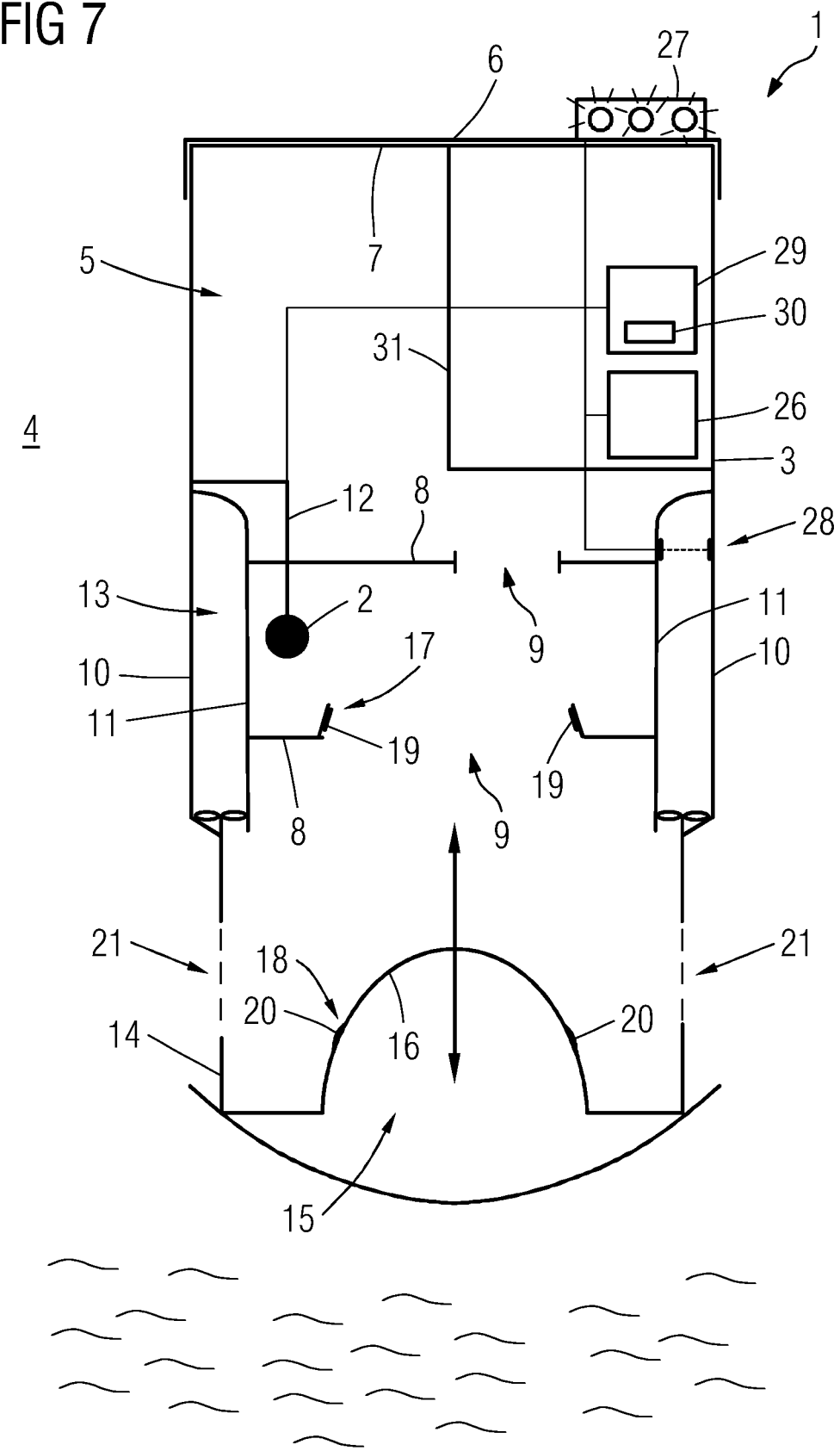

In the open position shown in FIG. 7, the closing body 15 is moved away from the bait platform 8 (here, the lower one) in such a way that the passage opening 9, which is delimited on the bait-platform 8 side, is exposed. Accordingly, a pest can pass through the passage opening 9 in the open position of the closing body. In the closed position shown in FIG. 8, the closing body 15 is moved against the lower bait platform 8 in such a way that the passage opening 9, which is delimited by the lower bait platform 8, is closed. Accordingly, a pest cannot pass through the passage opening 8 in the closed position.

In order to reach a bait 2 arranged in an upper region of the receiving space 5, a pest must first enter the housing part 3. Passages 21 are formed in the guide elements 14 on the closing-body side for this purpose. The passages 21 allow access to a lower region of the receiving space 5. To reach the bait 2, the pest must additionally go through the passage opening 9, which is delimited by the bait platform, onto the upper bait platform 8 and thus into an upper region of the receiving space 5. After biting on the bait 2, the pest can go from the upper region of the receiving space 5 into the lower region of the receiving space 5 and leave the apparatus 1 through corresponding passages 21 by passing through the passage openings 9.

The closure of the passage opening 9 delimited by the bait platform 8 implemented in the closed position of the closing body 15 prevents unwanted penetration of water which is possible in particular with high water or a water surge, for example, into the upper region of the receiving space 5, in which the bait 2 is arranged. Consequently, in the closed position of the closing body 15, this eliminates the risk of contamination of water in the manhole with the substances contained in the bait 2.

The closing body 15 shown in FIGS. 7-10 has a cup-shaped closing section 16, which, in the closed position, is in sealing contact with contact sections 17 formed on the edges on the bait-platform side, which delimit the passage opening 9 delimited by the lower bait platform 8. Due to the sealing contact of corresponding counter-contact sections 18 formed on the cup-shaped closing section 16 with the corresponding contact sections 17 on the bait-platform side, penetration of water into the upper region of the receiving space 5 is prevented. For the purpose of sealing, sealing elements 19 in the form of sealing lips are also formed on the contact sections 17 on the bait-platform side. With the same purpose, sealing elements 20 in the form of sealing rings are also designed on the counter-contact sections 18 on the closing-body side. As can be seen, additional sealing elements in the form of sealing lips not identified further are also provided in the region of the opening of the guide section 13 on the housing-part side and on lateral regions of the closing body 15.

Figure 8:
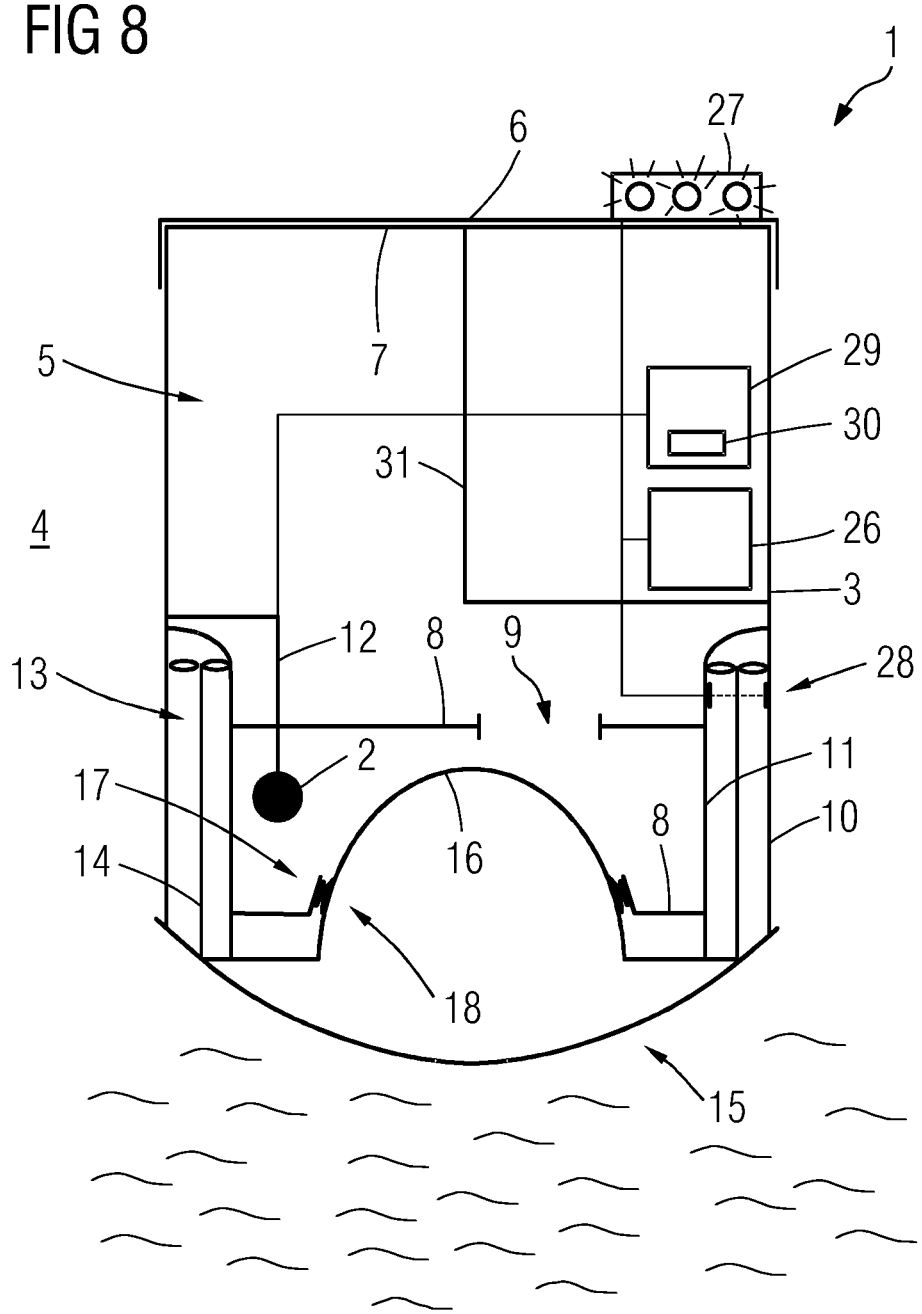

The movement of the closing body 15 from the open position into the closed position takes place in the embodiment according to FIGS. 7 and 8 due to a rise in the water level in the manhole. This is associated with the fact that the closing body 15 is designed as a float. The closing body 15 thus has, for example, a cavity (not shown) approximately filled with air. Alternatively or additionally, the closing body 15 may be manufactured from a low-density plastic material, in particular foamed, which floats on a water surface and does not sink because of the difference in density. A movement of the closing body 15 from the open position into the closed position is thus induced automatically by a rise in the water level of the manhole. Accordingly, a movement of the closing body 15 from the closed position into the open position is induced by a drop in the water level in the manhole.

The closing body 15 may be mounted to be reversibly or irreversibly movable, and the movement of the closing body 15 from the open position into the closed position, as described, may thus be reversible or irreversible. A reversibly movable mounting of the closing body 15 means that the closing body 15 can go from the open position to the closed position on its own. An irreversibly movable mounting means that the closing body 15 is or can be held in the closed position in particular releasably, via a closing-body-holding device (not shown) and thus cannot go from the closed position to the open position on its own. A corresponding closing-body-holding device can comprise at least one mechanical and/or magnetic holding means on the housing-part side and/or on the closing-body side, said means being equipped for mechanical and/or magnetic holding of the closing body 15 in the closed position. The mechanical or magnetic holding means on the housing-part side and/or on the closing-body side may thus interact in such a way that the closing body 15 is securely held in the closed position and is not readily releasable from same.

Figure 9:
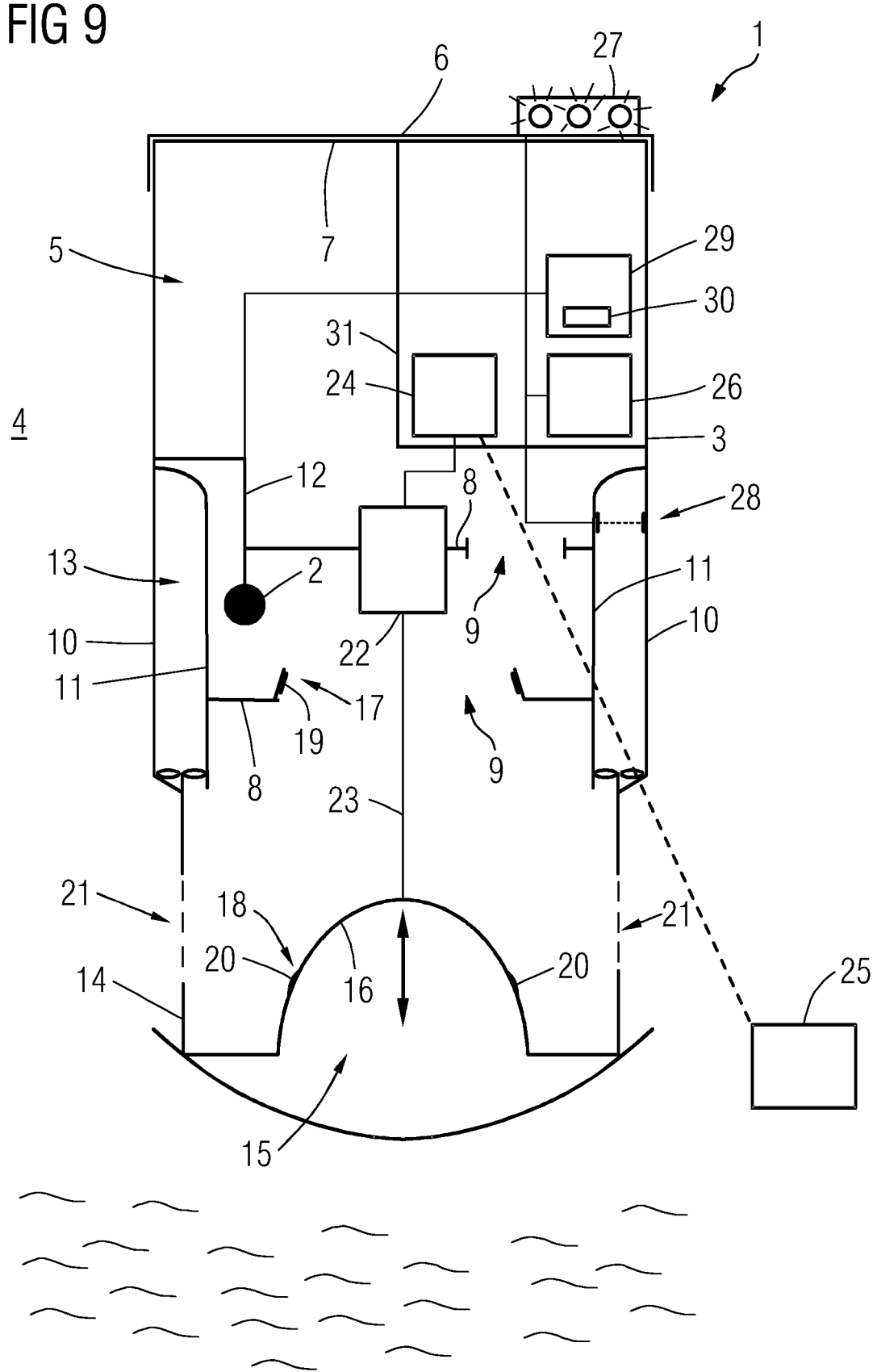

FIG. 9 shows another embodiment of an apparatus 1. In contrast to the embodiment according to FIGS. 7 and 8, the apparatus 1 here comprises a motorized drive device 22 in the form of an electric motor, which is coupled to the closing body 15 and is equipped to move the closing body 15 from the open position into the closed position and/or vice versa. A movement of the closing body 15 from the open position into the closed position can thus be induced here in a targeted manner by a motorized drive device 22 coupled to the closing body 15. The coupling between the motorized drive device 22 and the closing body 15 is implemented via traction means 23 in the form of a chain. The closing body 15 can also be designed as a float in this embodiment. Operation of the motorized drive device 22 is controlled via a control unit 24 assigned to the latter and equipped to generate control information (control commands) that controls the operation of the motorized drive device 22.

The control unit 24 is additionally equipped to generate the control information as a function of water level information describing the or a water level in the manhole supplied by a water-level detecting device 25 for detecting the water level in the manhole accommodating the apparatus 1. Consequently, operation of the motorized drive device 22 can be controlled as a function of the water level detected via a corresponding water-level detecting device 25 and mapped in corresponding water level information in the manhole, which accommodates the apparatus 1.

In the embodiment according to FIG. 9, the water-level detecting device 25 is arranged externally, i.e., in a spatially separate location from the apparatus 1. Consequently, the control unit 24 is also equipped to communicate with the (external) water-level detecting device 25, for example, in radio-based communication. For this purpose, the control unit 24 comprises a suitable reception device and the water-level detecting device 25 comprises a suitable transmission device. However, the or a corresponding water-level detecting device 25 may in principle also be integrated into the apparatus 1.

Figure 10:
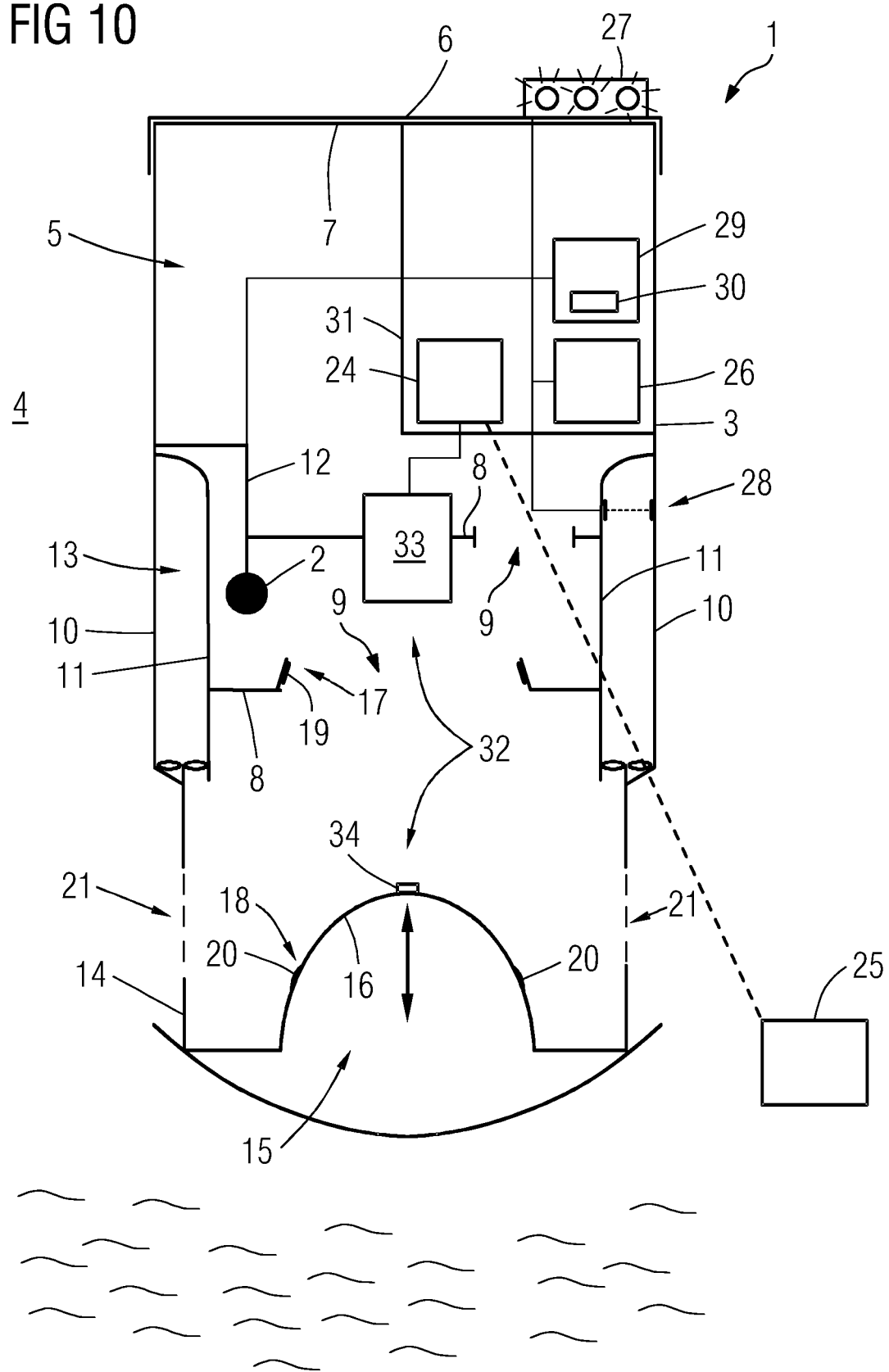

FIG. 10 shows another embodiment of an apparatus 1. In contrast with the embodiment according to FIG. 9, a motorized drive device 22 is not provided here but instead of a magnetic drive device 32 is provided. The magnetic drive device 32 comprises an electromagnetic magnet element 33 arranged in an upper region of the receiving space 5 and a permanently-magnetic magnet element 34 arranged on the closing-body side. The permanently-magnetic magnet element 33 on the housing-part side exerts such a high magnetic attractive force on the permanently-magnetic magnet element 34 on the closing-body side that the closing body 15 is moved from the open position into the closed position. The operation of the permanently-magnetic magnet element 33, i.e., in particular the energizing thereof, is likewise controlled via the control unit 24. The statements made in this regard in conjunction with the control of the operation of the motorized drive device 22 also apply similarly.

As an alternative to the configuration of corresponding electromagnetic magnet elements and/or permanently-magnetic magnet elements shown in the embodiment shown in FIG. 10, it is also possible to provide permanently-magnetic magnet elements 34 on the housing-part side and electromagnetic magnet element 33 on the closing-body side. It is also conceivable to provide electromagnetic or permanently-magnetic magnet elements 33, 34 on both the housing-part side and the closing-body side. The apparatus 1 shown in the embodiments according to FIGS. 7-10 also comprises a closed-position-detecting device 26 for detecting the closed position of the closing body 15. The closed-position-detecting device 26 is equipped to generate at least one item of acoustic and/or optical closed-position information on detection of the closed position of the closing body 15 and to output this information via output means 27, which are, for example, a loudspeaker and/or an LED, in particular in multiple colors. The closed-position-detecting device 26 comprises an optical sensor system 28 implemented via implementation of light barriers for detection of the closed position of the closing body 15.

The apparatus 1 shown in the embodiments according to FIGS. 7-10 additionally comprises a bite-detecting device 29 for detecting a bite on the bait. The bite-detecting device 29 is equipped to generate at least one item of acoustic and/or optical bite information on detection that the bait 2 has been bitten and to output this information via the output means 27. Consequently, the bite-detecting device 29 includes a sensor system 30 for detecting a bite on the bait. The sensor system 30 may detect, for example, the weight of the bait 2 arranged on the bait-holding device 12, wherein bite-induced changes in the weight of bait 2 allow conclusions about a bite on the bait. Likewise, the sensor system 30 may detect bite-related forces acting on the bait 2 and the bait-holding device 12, also allowing conclusions about a bite on the bait.

The bite-detecting device 29 can generate different acoustic and/or optical signals as a function of the bite information, for example, based on detection of the weight of the bait. With regard to the output of corresponding information in the form of optical signals, it is conceivable that the weight of a new bait 2 that has not been bitten can be a signal, for example, with optical signals of a green color and/or with constantly output optical signals; the weight of a partially bitten bait 2 can be signaled, for example, without optical signals of a yellow color and/or with optical signal output at a first blinking frequency; if the bait 2 has been completely eaten, this can be signaled, for example, by optical signals of a red color and/or optical signals output with a second blinking frequency, which is higher in comparison with the first blinking frequency. The same thing is of course also true of the output of acoustic signals, wherein the frequency and/or rhythm of a tone and/or a tone sequence in particular can be varied as a function of the weight of the bait 2 and/or of the forces acting on the bait 2 or the bait-holding device 12.

Contrary to the configuration of the output means 27 on the housing part 3 shown in the embodiments according to FIGS. 7-10, i.e., on the top side of the cover element 6, it is also possible that the or an output means 27 is integrated into an external mobile terminal, such as a smartphone, for example. In this case, the closed-position-detecting device 26 and/or the bite-detecting device 29 is equipped to communicate with the external mobile terminal and to transmit the closed-position information and/or the bite information to the external mobile terminal for output to the output means there. The communication is radio-based in particular, i.e., implemented via Bluetooth, WLAN, etc., for example, which is why the closed-position-detecting detecting device 26 and/or the bite-detecting device 29 include(s) corresponding radio-based transmission equipment.

Both the closed-position-detecting device 26 and the bite-detecting device 29 are optional and/or not absolutely necessary for the basic principle of the invention as implemented by means of the device 1.

For all previously shown embodiments, it is the case that a receiving chamber 31 is arranged in the receiving space 5, electrical and/or electronic components of the apparatus 1 being arranged therein, i.e., in particular the control unit 24 and corresponding detecting devices 26, 29 as well as optional devices for their electric power supply such as electric energy storage systems 84, for example. The receiving chamber 31 offers protection for these components with respect to external influences, i.e., in particular climatic and mechanical.

Figure 11:
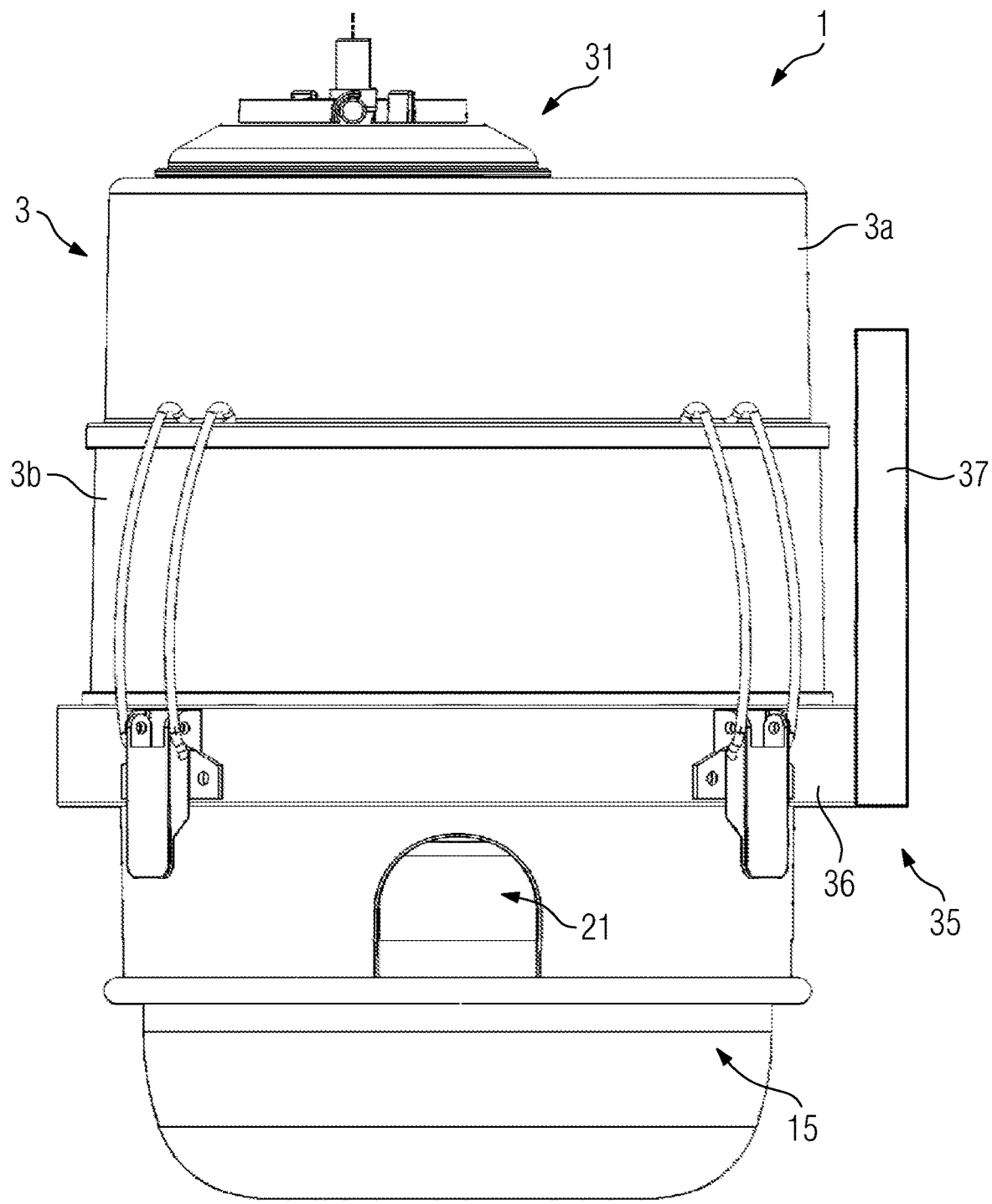
Figure 12:
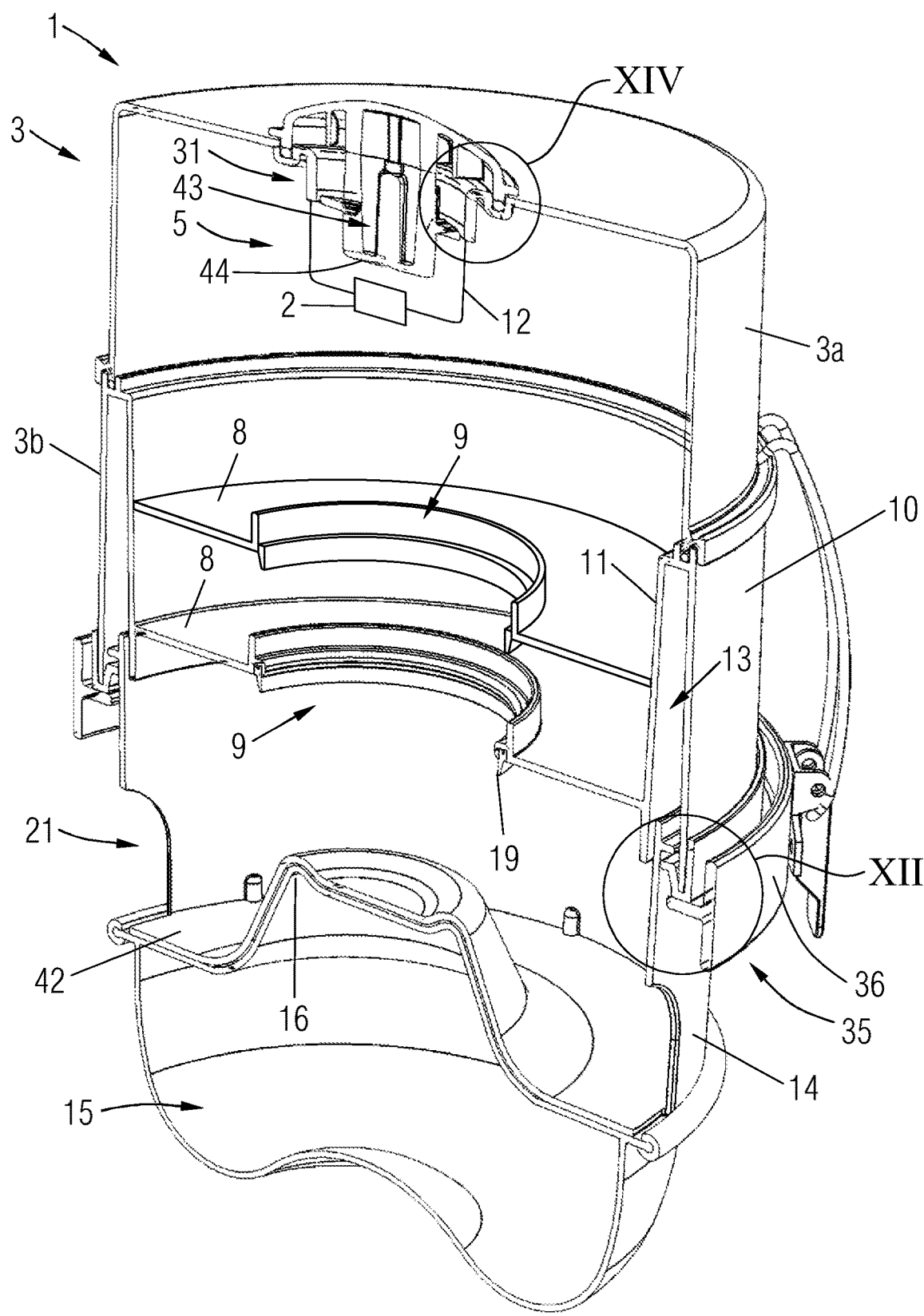
Figure 13:
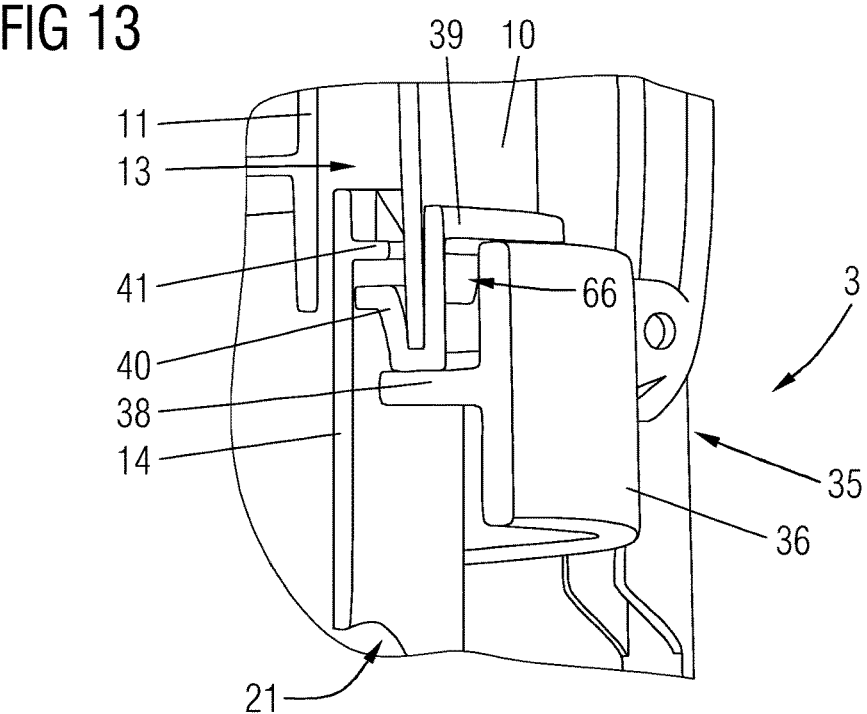
Figure 14:
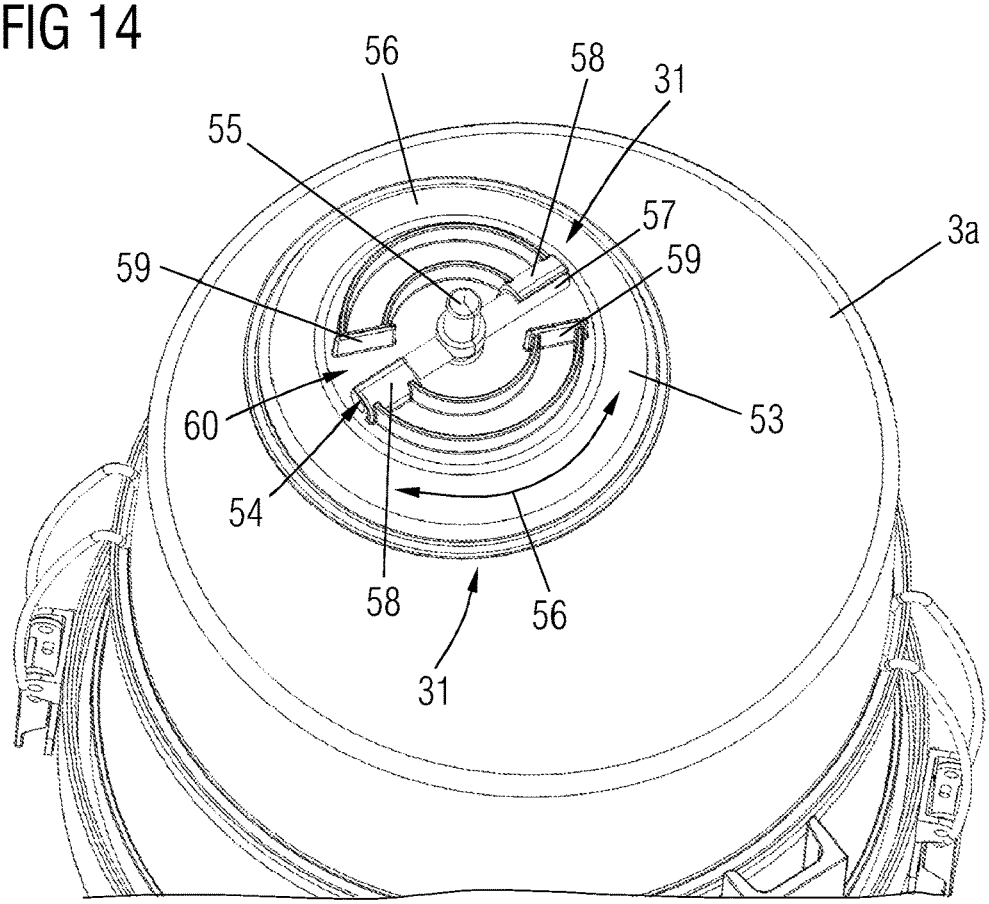
Figure 15:
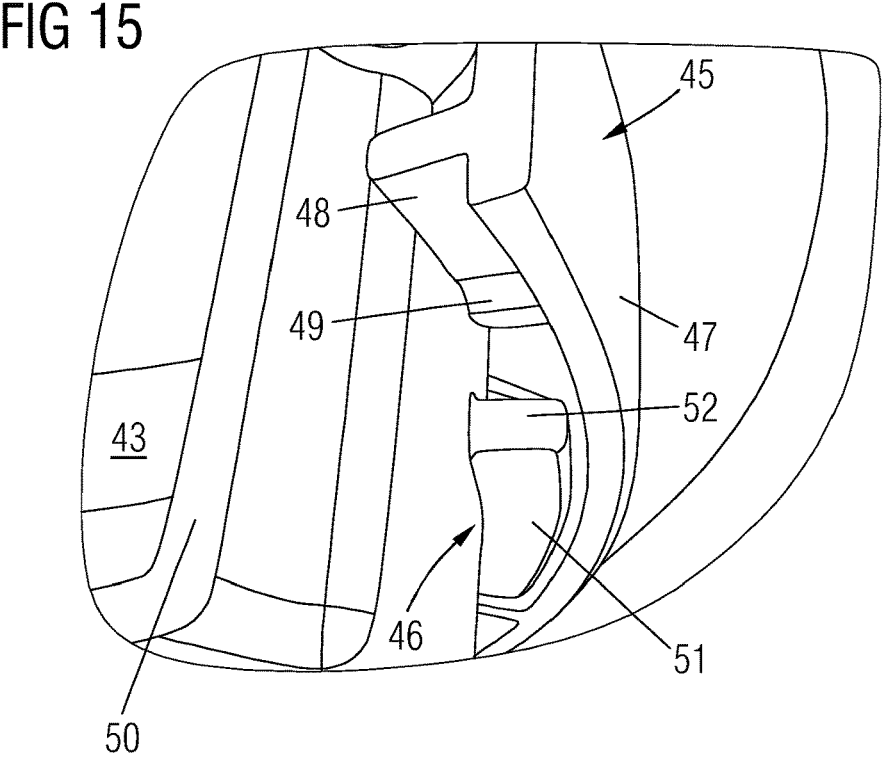

Schematic diagrams of an apparatus 1 according to an additional embodiment are shown in FIGS. 11-15. As can be seen, FIG. 11 is a perspective view of the apparatus 1, FIG. 12 is a longitudinal section through the apparatus 1 shown in FIG. 11; FIG. 13 is an enlarged view of the detail XIII shown in FIG. 12; FIG. 14 is a top view perspective of the apparatus 1 and FIG. 15 is an enlarged view of the detail XV shown in FIG. 12.

As revealed by the embodiment shown in FIGS. 11-15, the housing part 3 belonging to the apparatus 1 may also be embodied in multiple parts. The housing part 3 here is embodied as an upper housing part segment 3a and a lower housing part segment 3b. The housing part segments 3a, 3b can be fastened to one another by means of holding clamps that are not identified further here. Other fastening principles are of course also possible for fastening the housing part segments 3a, 3b to one another.

On the outside circumference of the lower housing part segment 3b, a fastening device 35 on the housing-part side by means of which the housing part 3 is and/or can be fastened, in particular releasably, on a wall of the sewer system 4, is arranged in the region of the end facing away from the upper housing part segment 3a. The fastening device 35 here comprises an outer ring element 36 made of steel, for example. The ring element 36 can be fastened onto the wall of a manhole by means of a profile-type holder 37, shown in FIG. 11.

As revealed in FIG. 13, an annular disk-shaped holding web 38 develops out of the ring element 36 in the radial direction. The holding web 38 supports a securing element 39 fastened on the outside wall 10 of the housing part 3, i.e., the outside wall 10 of the lower housing part segment 3b. The securing element 39 which is also embodied here in an annular shape is fastened onto the housing part 3, i.e., the outside wall 10 on the housing-part side, by means of a catch mechanism. The catch mechanism is implemented by the interaction of the catch elements on the housing outside wall side in the form of catch protrusions not shown in greater detail and opposing catch elements on the securing-element side in the form of catch recesses 66, in which the catch element on the housing outside wall side can engage. An inverted configuration is of course also conceivable, i.e., catch elements in the form of catch recesses on the housing outside wall side and catch elements in the form of catch protrusions on the securing-element side.

A region of the ring element 36 formed beneath the holding web 38 serves, in the closed position of an optional closing body 15, as a contact surface for a sealing element (not identified further) arranged and/or formed on the outside circumference side of the closing body 15. The securing element 39 serves for undetachable disposition of a closing body 15 on the housing part 3. This is implemented by the fact that a protrusion 40, embodied here as an angle on the securing-element side engages in the guide sections 13 on the housing-part side formed between the outside wall 10 on the housing-part side and the inside walls 11, which are offset radially to the latter toward the inside; the closing body 15 is prevented from slipping out of the guide section 13 by a protrusion 41 protruding radially from the upper section of the guide elements 14 on the closing-body side.

It can be seen in FIG. 12 that the surfaces 42 developing out of the closing section 16 of the closing body 15 are embodied with a slight inclination, i.e., by 3° to 5°, for example, so that water on the closing body 15 can flow radially outward.

A receiving body 31, here a cylinder-type receiving body, is arranged in the region forming a top side and/or end face of the housing part 3, i.e., the upper housing part segment 3*a*. The receiving chamber 31 has a cylinder-type receiving-chamber-base body 44 delimiting a receiving chamber volume 43 for receiving electrical and/or electronic components of the apparatus 1. As can be seen, the receiving-chamber-base body 44 protrudes into the receiving space 5 in some sections. A bait-holding device 12 for holding the bait 2 is arranged on a lower section of the receiving-chamber-base body 44 protruding into the receiving space 5.

In the embodiment shown, the receiving chamber 31 is releasably fastenable on the housing part 3, i.e., the upper housing part segment 3*a* here. The releasable fastening of the receiving chamber 31 on the housing part 3 is or can be formed by form-fitting interaction of fastening sections 45 on the housing-part side with fastening sections 46 on the receiving-chamber-base-body side. The receiving chamber 31 and the housing part 3 are thus each equipped with fastening sections 45, 46 by means of whose interaction a stable and/or undetachable, likewise releasable, fastening of the receiving chamber 31 on the housing part 3 can be implemented.

FIG. 15 shows that a form-fitting interaction of the respective fastening sections 45, 46 is understood to be an intermeshing or overlapping of corresponding fastening sections 45, 46 in at least some sections.

The receiving chamber 31 is arranged on the housing part 3, mounted to rotate between a fastened position and a release position. In the fastened position, the fastening sections 45 on the housing-part side and the fastening sections 46 on the receiving-chamber-base-body side interact in such a way that the receiving chamber 31 is releasably fastened on the housing part 3. In the release position, the fastening sections 45 on the housing-part side and the fastening sections 46 on the receiving-chamber-base-body side do not interact, so that the receiving chamber 31 is releasable from the housing part 3. The fastening of the receiving chamber 31 on the housing part 3 may thus be established and canceled by rotational movements of the receiving chamber 31 about an axis of rotation, which typically coincides with the axis of symmetry or central axis of the receiving chamber 31 relative to the housing part 3. The receiving chamber 31 can thus be converted from the fastened position into the release position and vice versa by rotational movements relative to the housing part 3.

As derived from FIG. 15, the fastening sections 45 on the housing-part side are designed as a ring-segment disk element 48 protruding radially inward from an axially-aligned cylinder-type section 47 of the housing part 3, having at least one shoulder-type fastening protrusion 49 protruding away from it axially. The fastening sections 46 on the receiving-chamber-base-body side are designed as a ring-segment disk element 51 protruding radially outward from a cylinder-type shoulder 50 of the receiving-chamber-base body 44, with an axially-protruding shoulder-type fastening protrusion 52, corresponding to the fastening protrusion 49 formed on the fastening section 45 on the housing-part side, i.e., designed and/or aligned to be opposite.

To implement corresponding rotational movements of the receiving chamber 31 relative to the housing part 3, the receiving chamber 31 has a tool working region 54 in the region of a cover section 53 exposed at the top, a T-shaped tool 55 here being able to engage therein with an engagement section 57 in a form-fitting manner (see particularly FIG. 14). Rotational movements can be transferred to the receiving chamber 31 by means of the tool 55 engaging in the tool working region 54 as shown in FIG. 14 in order to convert the receiving chamber 31 from the fastened position into the release position and vice versa. As can be seen, the tool working region 54 here is designed with tool receptacles 58 in the form of ring segments, into which the engagement section 57, which is designed to have a roundish cross section, can engage on the tool side, so that counterclockwise rotational movements of the tool 55 can lead to counterclockwise rotational movements of the receiving chamber 31. A stop section 59 is designed and arranged opposite the engagement section 57 on the circumference. A clearance space 60 extending around the periphery is formed between the engagement section 58 and the stop section 59, by means of which the tool 55 can be inserted into the tool working region 54 in order to interact with the former accordingly.

Due to the configuration and/or design of the tool working region 54 in the region of an upper exposed cover section 53 on the receiving chamber 31, the tool working region 54 is always accessible (from above). The geometric shape of the tool working region 54 is in all cases adapted to the shape of the tool 55. In the present case, the geometric shape of the tool working region 54 is such that a T-shaped tool 55 can act on it in a form-fitting manner, so that rotational movements can be transferred to the receiving chamber 31 via rotational movements of the tool 55, as indicated by the double arrow 56.

Accordingly, the tool working region 54 is readily accessible, i.e., in particular from above, in a condition of the apparatus 1 as inserted into a manhole. Through suitable shaping and dimensioning of a corresponding tool 55, it is not absolutely necessary for a user to descend into the manhole in order to convert the receiving chamber 31 from the fastened position into the release position or vice versa through corresponding rotational movements. The receiving chamber 31 may thus be released from the housing part 3 from outside of the manhole and particularly removed from the manhole. This may be practical for monitoring purposes, for example, to ascertain whether there has been a bite on the bait, so that controls can be greatly simplified and can be performed much more promptly.

Since the bait 2 is held via the bait-holding device 12 arranged on the receiving chamber 31, the receiving chamber 31 together with the bait-holding device 12 and the bait 2 held thereon can be removed from the manhole without entering the manhole, it is possible to detect whether there has been a bite on the bait and, if necessary, to replace the or one bait 2 and the receiving chamber 31 together with the bait-holding device 12 and the bait 2 held thereon can be reintroduced back into the manhole.

Figure 16:
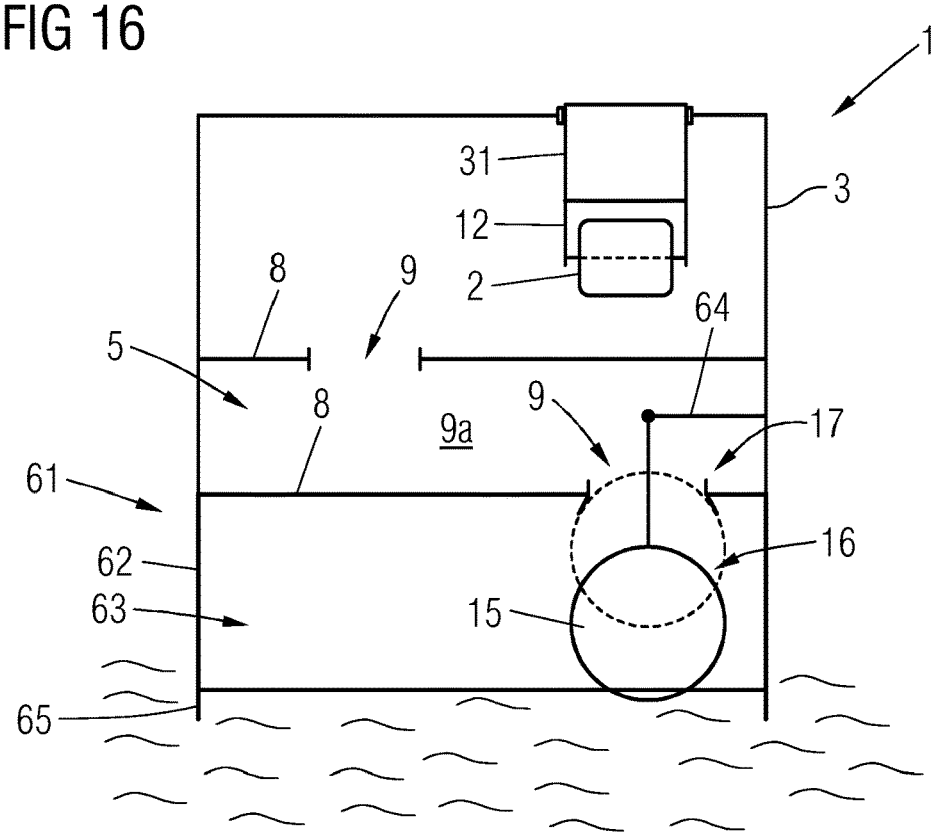
Figure 17:
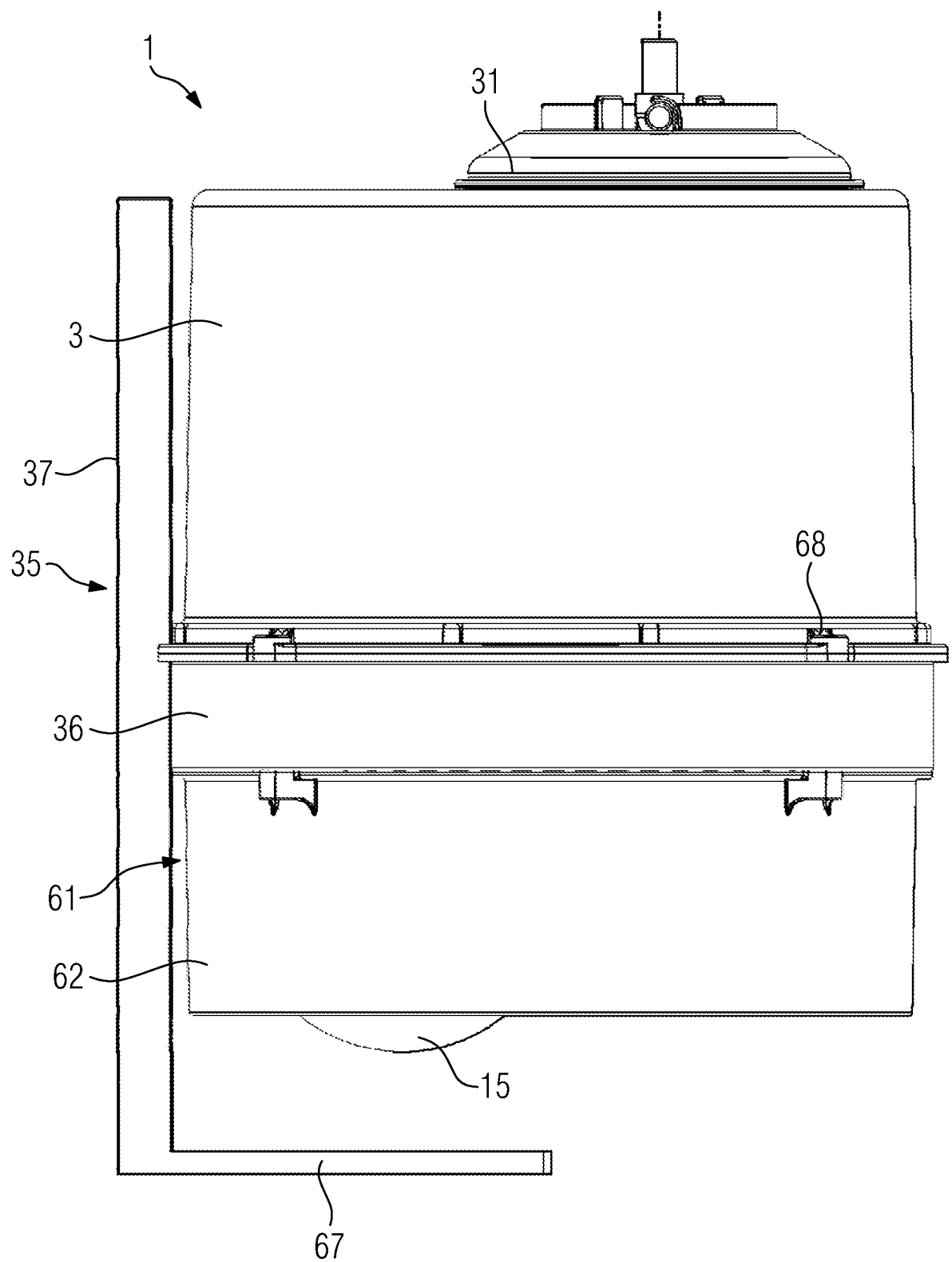
Figure 18:
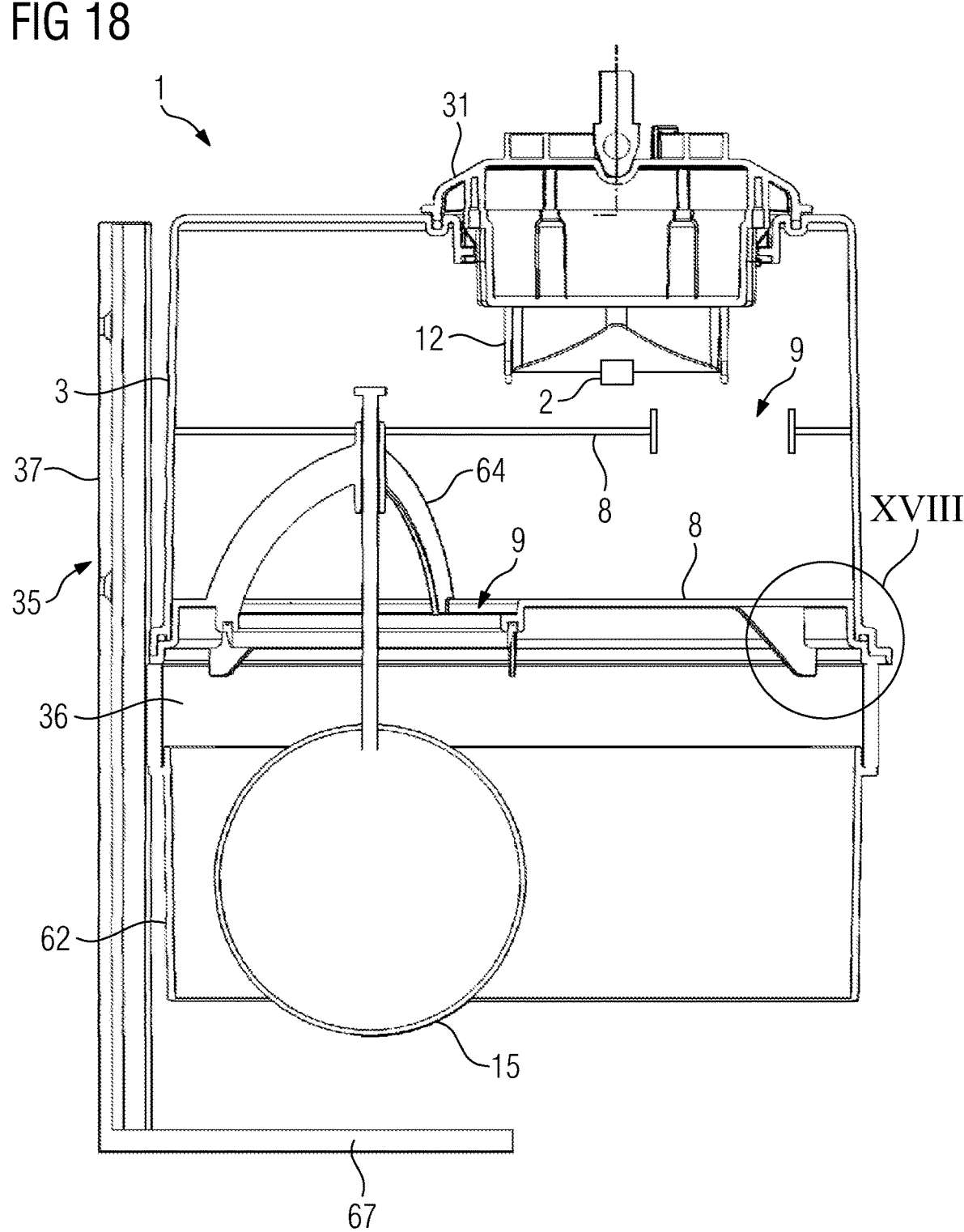
Figure 19:
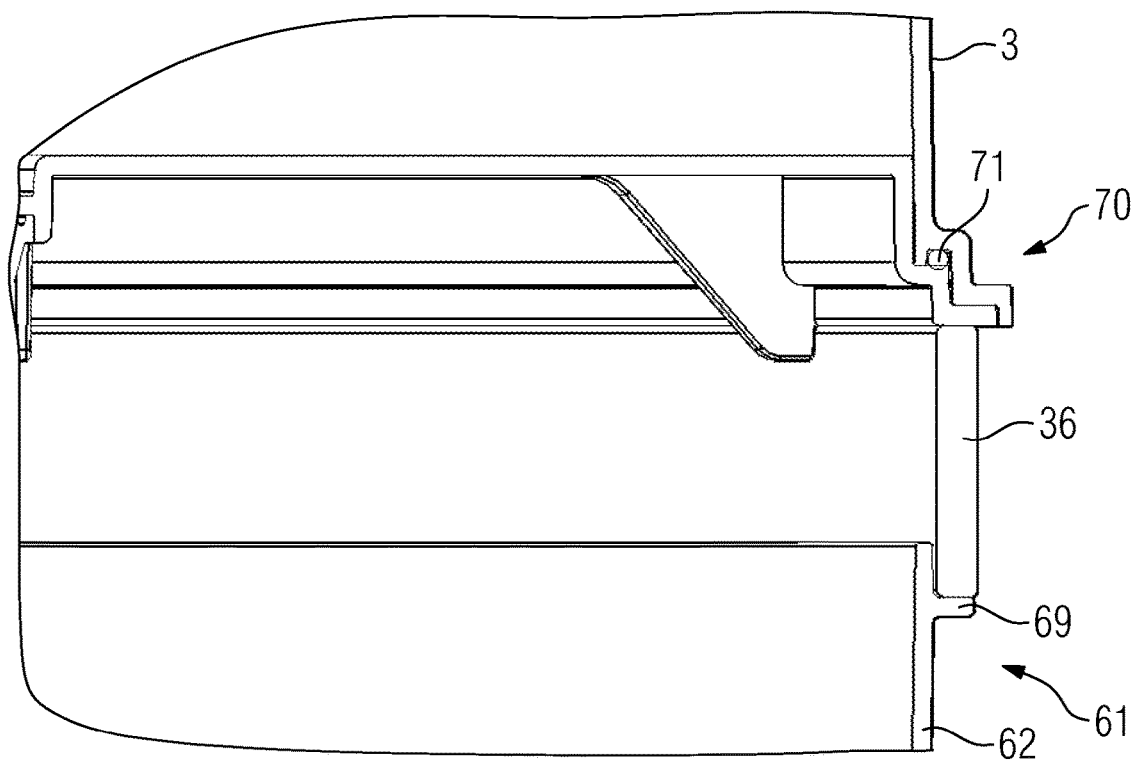

Schematic diagrams of an apparatus 1 according to an additional embodiment are shown in FIGS. 16-19. FIG. 16 shows a strict schematic diagram of the apparatus 1; FIG. 17 shows a perspective diagram of the apparatus 1; FIG. 18 shows a longitudinal section through the diagram shown in FIG. 17 and FIG. 19 shows an enlarged view of the detail XIX shown in FIG. 18.

The embodiment according to FIGS. 16-19 additionally comprises a water-surge-protection element 61 for protection against the penetration of water into the receiving space 5, which is delimited by the housing part 3, in particular into an upper region of the receiving space 5 situated above the passage opening 9 delimited by the lower or bottom bait platform 8 in the event of a sudden and/or surging rise in the one level in the manhole, into which the housing part 3 is to be and/or is inserted.

The water-surge-protection element 61 is arranged beneath the lower or bottom bait platform 8. The water-surge-protection element 61 has an annular and/or cylindrical base body 62, which delimits a water surge receding volume 63 for receiving a certain amount of water flowing in the or a manhole. A sudden surge-type rise in the water level in the manhole due to heavy rain, for example, thus results in the water first penetrating from underneath into the water-surge-receiving volume 63 and filling it up.

The closing body 15, which is, as mentioned, purely optional, and is designed here as a float, is mounted movably with the base body 62 of the water-surge-protection element 61, i.e., within the water-surge-receiving volume 63, in such a way that it is moved from the open position shown in FIGS. 16, 17 into the closed position indicated with a dotted line in FIG. 16 with a rise in the water level in the water-surge-receiving volume 63 associated with the admission of water into the water-surge-receiving volume 63. The movable mounting of the closing body 15 is implemented by a holder 64 on the housing-part side, here in the form of an angular gallows holder. A simple hanging holder, such as that shown in FIG. 16, would also be conceivably feasible or supported.

In the closed position, the closing body 15 having a closing section 16 is in sealing contact with contact sections 17 being formed by the edges of the lower or bottom bait platform 8 in some sections, which delimit the passage opening 9, which is in turn delimited by the lower or bottom bait platform 8. Penetration of water into the upper region of the receiving space 5 on the housing-part side is prevented by the sealing contact of the closing body 15 with corresponding contact sections 17 on the bait-platform side. There is no possibility for water to enter the upper region of the receiving space 5 and be contaminated there by the substances contained in the bait 2.

The base body 62 of the water-surge-protection element 61 is shown here as open, i.e., without a bottom surface. However, it is of course also possible for the base body 62 of the water-surge protection element 61 to comprise a bottom surface having at least one water surge inlet opening in the region of the side thereof facing away from the lower or bottom bait platform 8. A closing body 15 may then be arranged in the surge-water-inlet opening in at least some sections when in the open position. When there is a rise in the water level, the closing body 15, which is designed as a float, rises up from the water surge inlet opening, so that water can enter the water-surge-receiving volume 63 until the closing body 15 is finally moved away from the open position into the closed position, as already described.

The base body 62 of the water-surge-protection element 61 in the embodiment according to FIG. 16 comprises a number of feet 65, designed in the form of webs, for example, which serve to support the base body 62, optionally also the housing part 3 arranged thereon plus the components of the apparatus 1 fastened or arranged therein. The base body 62 may of course also be designed to be completely flat on the bottom and/or end side and thus the corresponding feet 65 may be omitted.

On the basis of FIG. 17, it is apparent that the apparatus 1 can be fastened on the wall of a manhole via a fastening device 35. The fastening device 35 therefore comprises an outer ring element 36 made of steel, for example. The ring element 36 can be fastened on the wall of a manhole via a profile-type holder 37. As can be seen, in the embodiment shown in FIG. 17, the corresponding feet 65 are omitted on the part of the water-surge-protection element 61. To implement a stable mounting of the apparatus 1 on a substrate, the profile-type holder 37 is designed with an extension and comprises a mounting leg 67 protruding away from the latter at an angle, in particular at a plumb line, said mounting leg being identified as or considered to be a pedestal of the apparatus 1.

The water-surge-protection element 61 is fastened on the housing part 3 here by screw connections. Accordingly, both the water-surge-protection element 61 and the housing part 3, here provided with screw receptacles 68 on the outside circumference, through which screw-type connecting elements (not shown in detail here), in particular threaded screws can be passed. It is of course also conceivable to provide each of the corresponding screw receptacles 68 on the inside circumference side.

It is apparent from the sectional view shown in FIG. 18 that the ring element 36 is arranged between the water-surge-protection element 61 and the housing part 3. On the basis of the detail shown in FIG. 19, it is apparent that the water-surge-protection element 61 is therefore provided with ring-shaped holding webs 69, which protrude radially accordingly and form a lower mounting point for the ring element 36. The housing part 3 is provided with a radial enlargement 70 in the region of its free end facing the water-surge-protection element 61, the ring element 36 engaging at the region of the its end facing the housing part 3 in said enlargement. Between the housing part 3 and the ring element 36, a sealing element 71, here in the form of a sealing ring, may be arranged and/or designed between the housing part 3 and the ring element 36.

Figure 20:
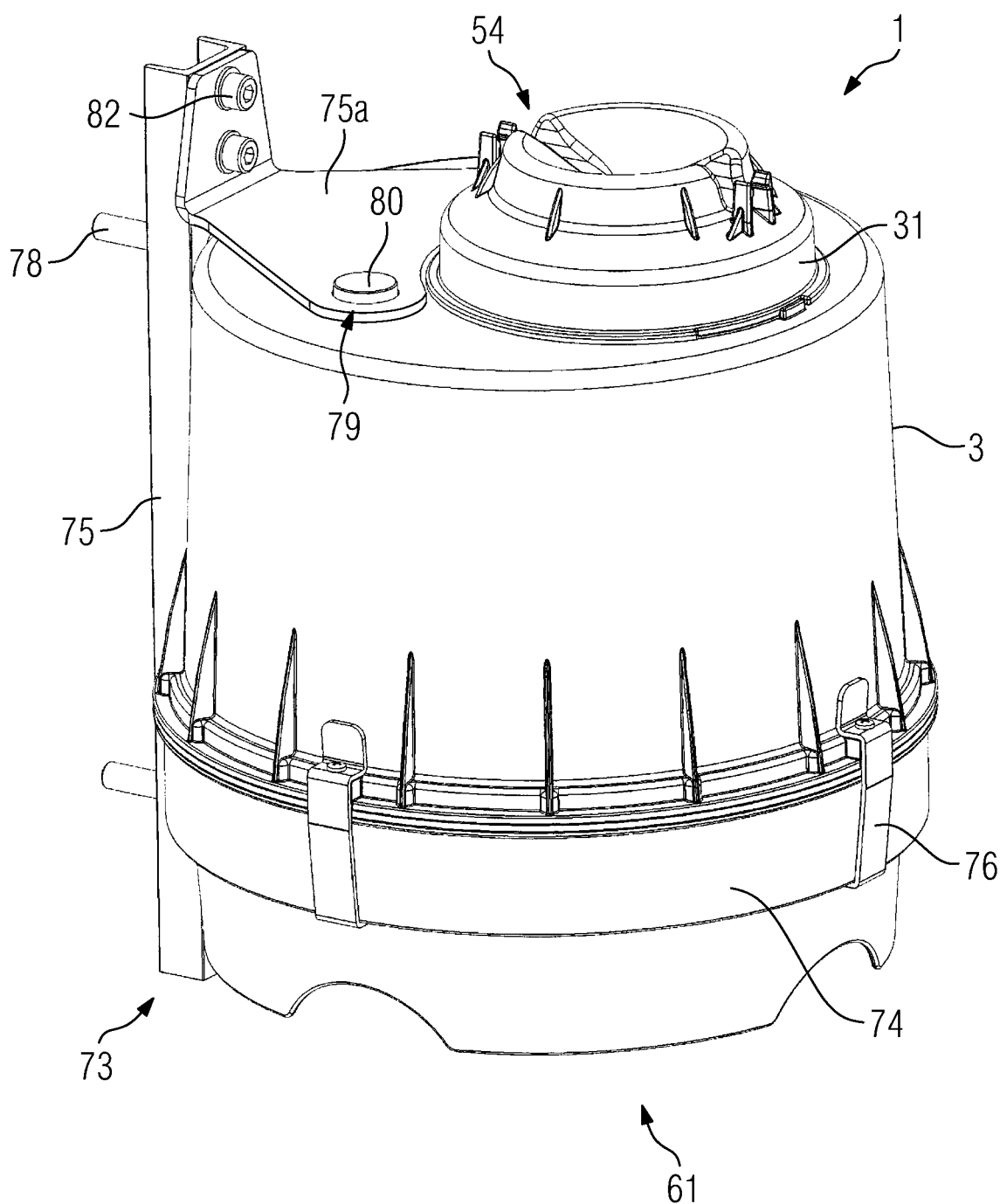
Figure 21:
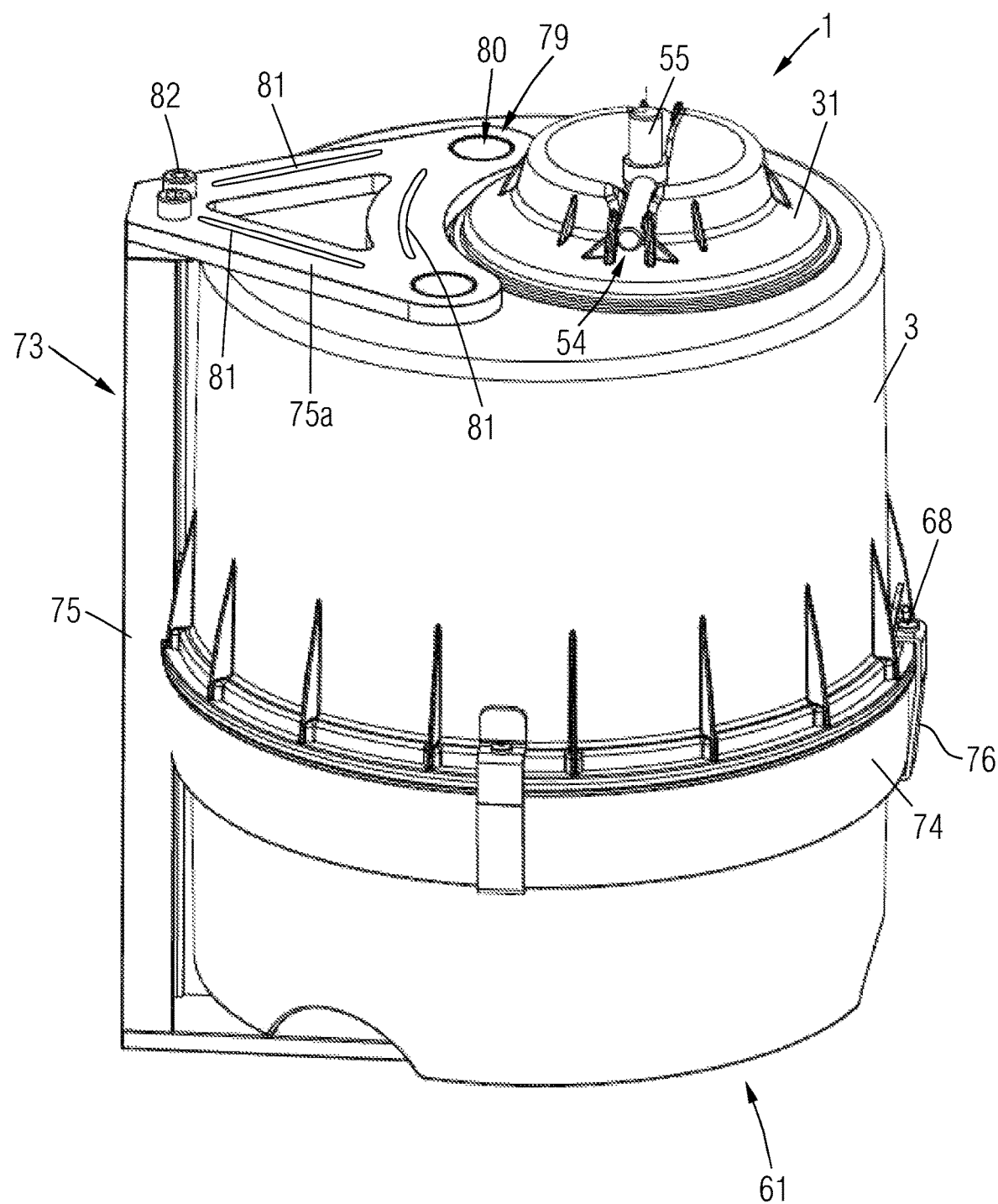
Figure 22:
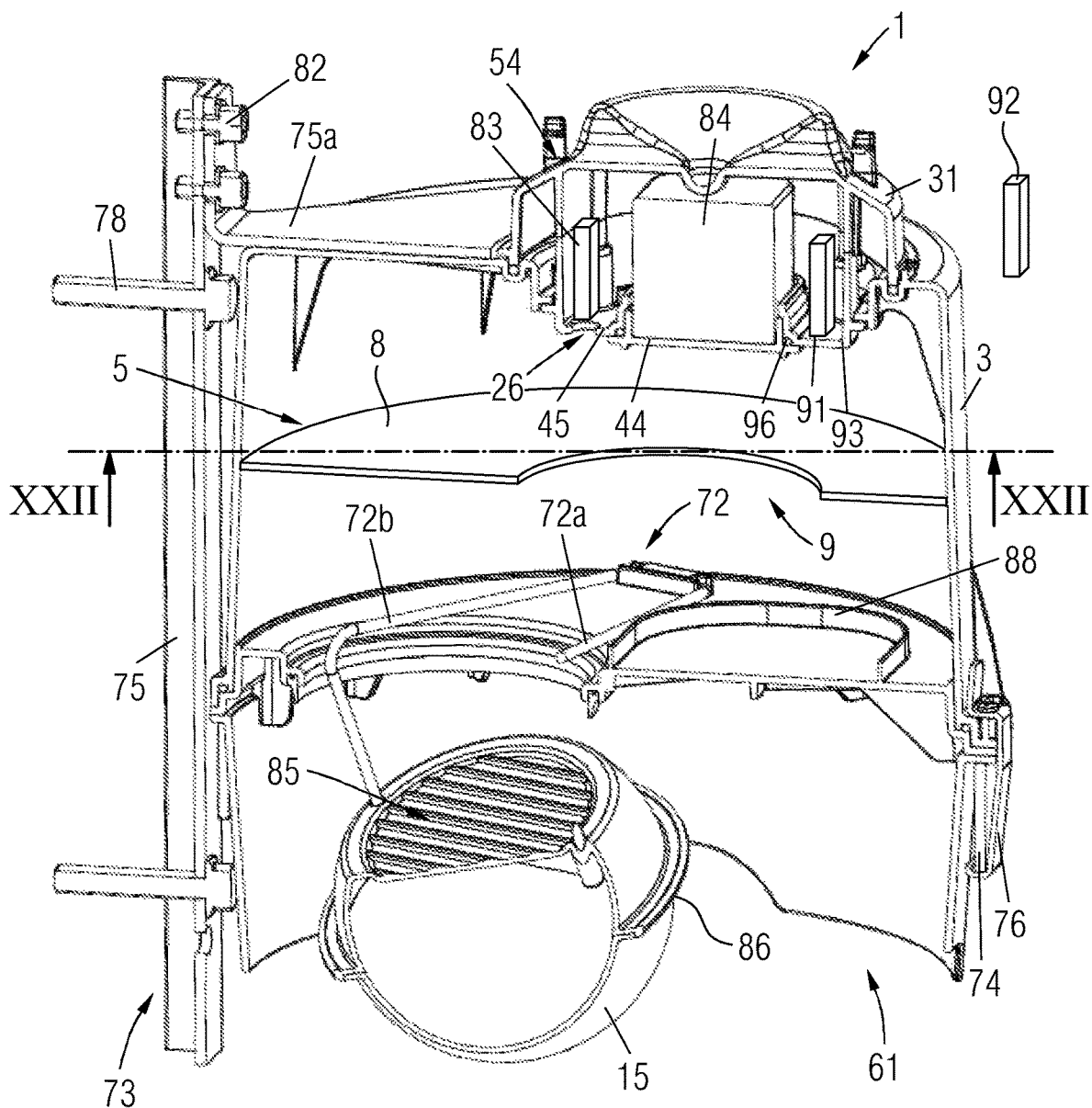
Figure 23:
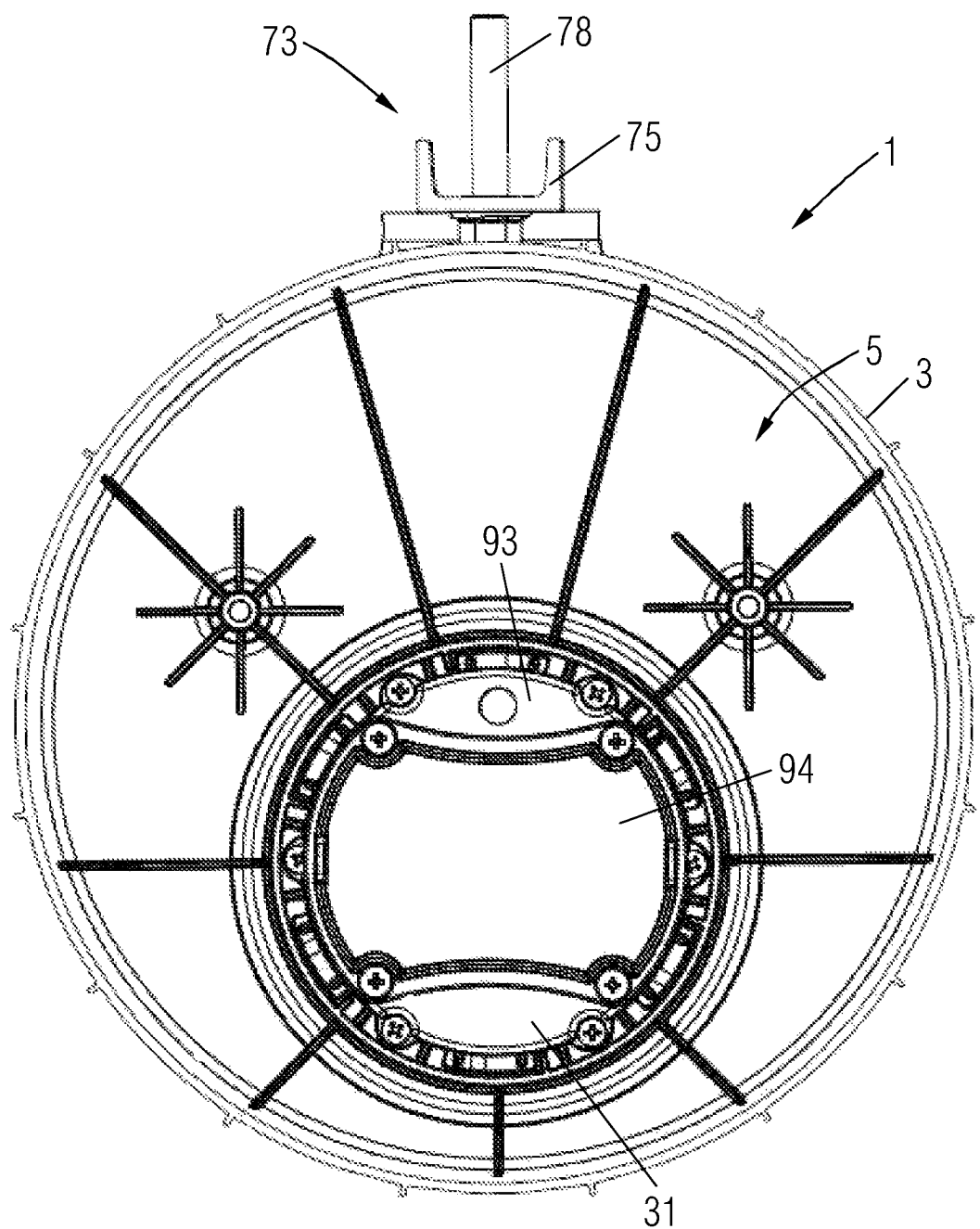

Schematic diagrams of an apparatus 1 according to additional embodiments are shown in FIGS. 20-23. FIGS. 20 and 21 each relate to a perspective view of an additional embodiment of an apparatus 1; FIG. 22 shows a longitudinal section through the apparatus 1 shown in FIG. 20, and FIG. 23 shows a cross section through the apparatus 1 shown in FIG. 22.

FIG. 22 shows a mounting of a closing body 15, which is optional, as mentioned, and movable relative to the lower bait platform 8 by means of a clamp-type or bracket-type holding element 72, mounted in particular pivotably on the lower bait platform 8. On the one hand, the holding element 72, which is also to be identified as a holding clamp or a holding bracket, is fastened on the bait platform 8, in particular at one end, and, on the other hand, in particular on the other end, is fastened on the closing body 15. A certain path of movement, which the closing body 15 runs through in movement from the open position into the closed position and vice versa, is defined by the connection of the closing body 15 to the holding element 72, the connection of the holding element 72 to the lower bait platform 8 as well as the geometric dimensions, i.e., in particular the shape of the holding element 72.

The holding element 72 comprises two holding element sections 72a, 72b running at an angle to one another. On the basis of FIG. 22, it can be seen that the holding element sections 72a, 72b reach through the passage opening 9, which is delimited on the bait-platform side in the open position of the closing body 15. The holding element sections 72a, 72b are bent in an L shape. The holding 72 thus has an (essentially) L-shaped geometric shape.

Based on FIGS. 20-23, a particularly expedient fastening device 73 by means of which the housing part 3 can be fastened to a wall of a sewer system 4, in particular of a manhole, in particular releasably, is also shown. The fastening device 73 comprises a ring-shaped first fastening element 74, which extends around the housing part 3 on the exterior peripheral side and is fastened on the housing part 3 by means of fastening brackets 76 bolted onto the housing wall 3, and a second fastening element 75 for fastening the first fastening element 74 as well as the housing part 3 fastened thereon onto the wall of a sewer system 4 and/or of a manhole. By means of the fastening device 73, fastening of the housing part 3 on a wall of a sewer system 4 and/or of a manhole in a stable manner, in particular with respect to forces acting on the housing part 3 due to high water or a water surge. The fastening of the second fastening element 75 on the wall of a sewer system 4 and/or of a manhole is implemented, for example, by means of fastening bolts 78 and/or screws, which can be anchored in a stable form in the wall of a sewer system 4 and/or of a manhole, for example, by walls or screws, and which pass through horizontal and/or vertical boreholes 77, respectively, originating from the second fastening element 75, optionally provided with a thread.

As can be seen, the fastening device 73 is designed in multiple parts. To implement a buoyancy safety measure, the second fastening element 75 has a fastening-element section 75*a*, which extends in some sections beyond the housing part 3 on the top side, forming a buoyance safety measure in some sections. The housing part 3 is thus protected against buoyance forces due to high water and/or water surges and is fastened in its position, in particular vertically, in a fixed position on the sewer system 4.

All the components of the fastening device 73 are formed from one or more mechanically-stable and corrosion-resistant materials, for example, stainless steels and/or material structures or comprise such materials and/or material structures.

On the basis of the embodiment shown in FIG. 21, it can be seen that a plurality of fastening-element sections 75*a* may be present. FIG. 21 shows two leg-type and/or strut-type fastening-element sections 75*a* running at an angle to one another, preferably in a V shape, and connected to one another via another leg-type and/or strut-type fastening-element sections 75*a*.

The fastening-element sections 75*a* shown in the embodiments according to FIGS. 20-23 are releasably fastened to the exposed top side of the housing part 3 in a form-fitting connection (without damage and/or destruction). The fastening is thus accomplished by means of a form fit, i.e., by way of the form-fitting interaction of form-fitting element 79 on the part of the fastening-element sections 75*a* with corresponding form-fitting elements 80 on the part of the housing part 3. Form-fitting elements 79 formed on the respective fastening-element sections 75*a* are designed as passages, form-fitting elements 80 formed on the housing part 3 are formed by protrusions, in particular vertical ones which grip into or through corresponding passages in the fastened state.

On the basis of the embodiment according to FIG. 21, it can be seen that the respective fastening-element sections 75*a* can be designed with reinforcing structures 81, in particular those with a reduced cross section, to increase the mechanical stability of the fastening-element sections 75*a*. The material thickness and thus the weight of the fastening device 73 may be reduced in this way without sacrificing the mechanical stability. In the embodiment according to FIG. 21, the corresponding reinforcing structures 81 are beads.

The respective fastening-element sections 75*a* are designed as separate components in the embodiments according to FIGS. 20-23 and are fastened releasably on a profile-type base body of the second fastening element 75 by means of screw bolts 82, i.e., a screw fastening (without damage and/or destruction). The fastening-element sections 75*a* could also be designed integrally with the second fastening element 75.

FIG. 22 shows an optional monitoring device 83 for monitoring at least one part of the receiving space 5 delimited by the housing part 3. The monitoring device 83 is arranged on the receiving chamber 31 in such a way that the most extensive possible monitoring of the receiving space 5 can be implemented. The monitoring device 83 comprises a suitable optical sensor system for monitoring the receiving space 5. The monitoring device 83 is designed as an infrared sensor system and/or camera in the embodiment according to FIG. 22.

It is possible by means of the monitoring device 83 to detect and evaluate all processes in the or a certain region and/or subregion of the receiving space 5. In particular rodent-related processes can be detected quantitatively and/or qualitatively and evaluated and/or assessed. Processes of particular interest to be monitored quantitatively and/or qualitatively include, for example, ingresses of rodents into the receiving space 5, egresses of rodents out of the receiving space 5, the behavior, i.e., in particular the biting and/or movement behavior of the respective rodents having ingress into the receiving space 5 in the receiving space 5, etc. In general, the frequenting of the receiving space 5 per unit of time can be detected and evaluated and/or assessed quantitatively and/or qualitatively. Since monitoring information and/or data detected by the monitoring device 83 can of course be transmitted via a communications link designed via a suitable communications device 91, in particular radio based, to an external terminal 92 on the user side, in particular a mobile terminal, a "monitoring" of all processes in the receiving space 5 can be implemented via a corresponding monitoring device 83 without the requirement of entry into the manhole equipped with the apparatus 1 and/or into the sewer system 4 equipped with the apparatus 1. The communication is expediently radio based, i.e., via Bluetooth, WLAN, etc., for example, which is why the monitoring device 83 comprises and/or is connected to a corresponding radio-based transmission equipment unit (not shown).

The monitoring device 83 is supplied with electric power via a rechargeable electric energy storage system 84 arranged in the receiving chamber 31. The energy storage system 84 is an electrochemical energy storage system in the form of a rechargeable battery. Use of an inductive energy storage system, i.e., one that is rechargeable by means of electromagnetic induction would also be conceivable.

On the basis of the embodiment according to FIG. 22, a surface structuring 85 of the cup-shaped and/or spherical-segment-shaped, optional closing body 15 can be detected in some sections. The surface structuring 85 facilitates access to the lower bait platform 8 for a rodent via the closing body 15. The surface structuring 85 is designed as a stepped and/or ribbed structure of the circular disk-shaped segment of the spherical-segment-shaped closing body 15 and offers a hold and/or sticking for a rodent entering the closing body 15. The surface structuring 85 correspondingly inhibits or prevents the rodent from slipping off the closing body 15 and thus serves in the sense of an "entry assistance" for access to the lower bait platform 8. A corresponding surface structuring 85 of course inversely also serves in the sense of an "exit assistance" for a rodent for leaving the lower bait platform 8. In addition, an annular section 86 which also serves in the sense of a corresponding "entry aid" and/or "exit aid" is also present on the side of the closing body 15.

FIG. 22 also shows a region 87 for a bait 2 delimited by a wall 88 protruding here at an angle from the lower bait platform 8, in particularly vertically.

The embodiment according to FIG. 22 shows a special mounting of a corresponding energy storage system 84. The energy storage system 84 is mounted on a bottom plate 94 fastened (releasably) on a bottom section 93 of the receiving chamber 31 protruding into the receiving space 5. The bottom plate 94 is fastened on the bottom section 93 by means of fastening screws, which are not identified in greater detail (cf. FIG. 23). As can be seen, a sealing element 96 in the form of a sealing ring is situated between the bottom plate 94 and the bottom section 93. Another sealing element, which is not identified further, is situated between the receiving chamber 31 and the housing part 3.

The bottom plate 94 is provided with walls 95 protruding at an angle, in particular vertically, delimiting a receiving region for the energy storage system 84. The energy storage system 84 can typically be arranged with an accurate fit in the receiving region. The bottom plate 94 together with the energy storage system 84 arranged thereon can be considered to this extent as a separate module that can be fastened to the receiving chamber 31 and can be released easily from the receiving chamber 31 and fastened on it again, for example, as part of an exchange or recharging operation for the energy storage system 84.

As can be seen, both the monitoring unit 83 and the communications unit 91 are arranged at the side of the energy storage system 84 on the bottom section 93. An opening 95 on the bottom section side is provided for the monitoring unit 83.

Another possibility of movable mounting of an optional closing body 15 by means of a flap-valve device 89 is recognizable on the basis of the embodiments according to FIGS. 24 and 25. In the embodiment according to FIG. 24, a corresponding flap-valve device 89 comprises a flap-valve element 90, which is movably mounted relative to a lower bait platform 8 here, in particular being mounted pivotably, and which is moved away from the lower bait platform 8 in an open position, such that the passage opening 9 delimited on the bait-platform side is exposed and is moved toward the bait platform 8 in a closed position, represented by dotted lines, such that the passage opening 9 delimited on the bait-platform side is closed. The closing body 15 here may be an integral component of the flap-valve device 89 in the form of a corresponding flap-valve element 90. It is also possible to fasten a separate closing body 15 on a corresponding flap-valve 90. The closing body 15 may be designed as a float or may at least comprise a float.

On the basis of the embodiment according to FIG. 25, it can be seen that a corresponding flap-valve device 89 may also comprise multiple flap-valve elements 90, which are moved away from a lower bait platform 8 here in a respective open position, such that the passage opening 9 delimited on the bait-platform side is exposed, and moved toward the bait platform 8 in a respective closed position, which is shown with a dotted line, such that the passage opening 9 delimited on the bait-platform side is closed jointly by the flap-valve elements 90. In the embodiment according to FIG. 25, respective closing bodies 15 are arranged on respective flap-valve elements 90.

Figure 26:
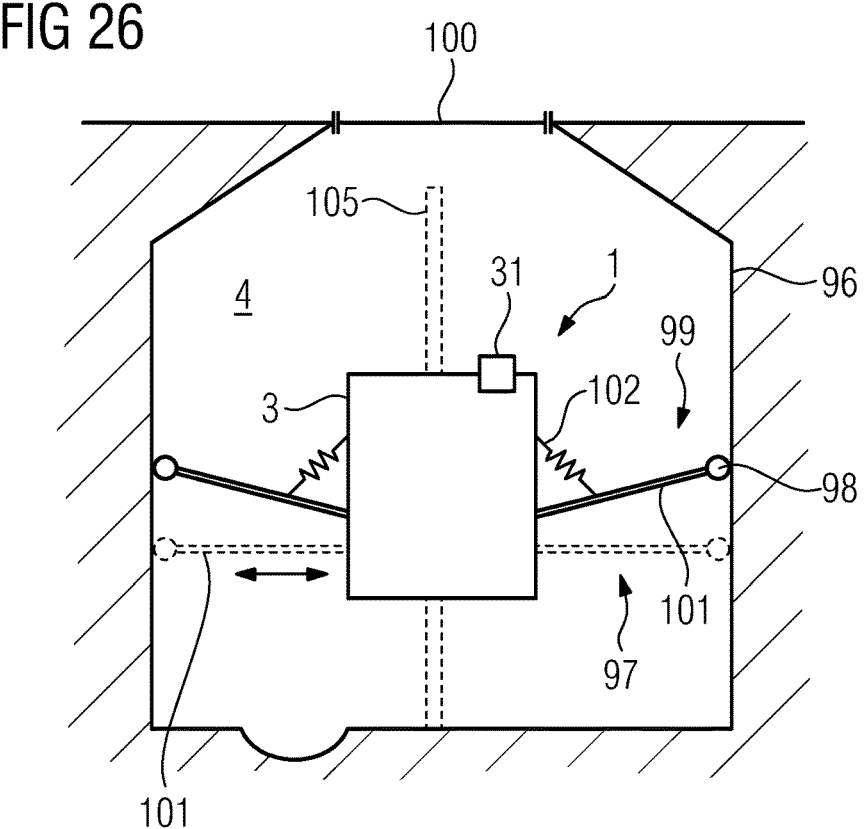
Figure 27:
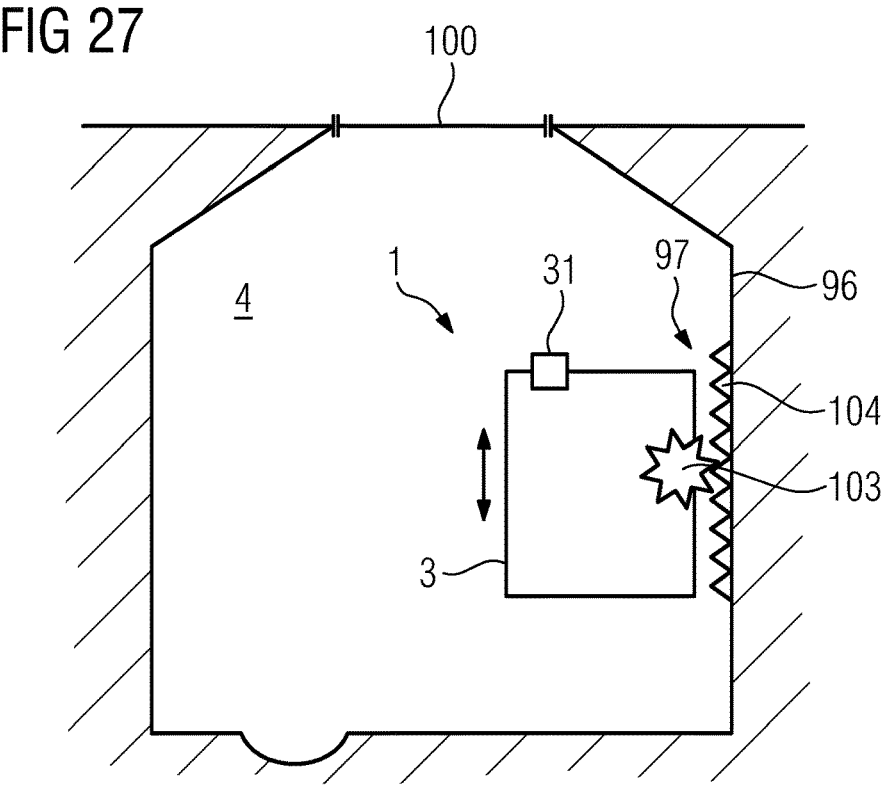
Figure 28:
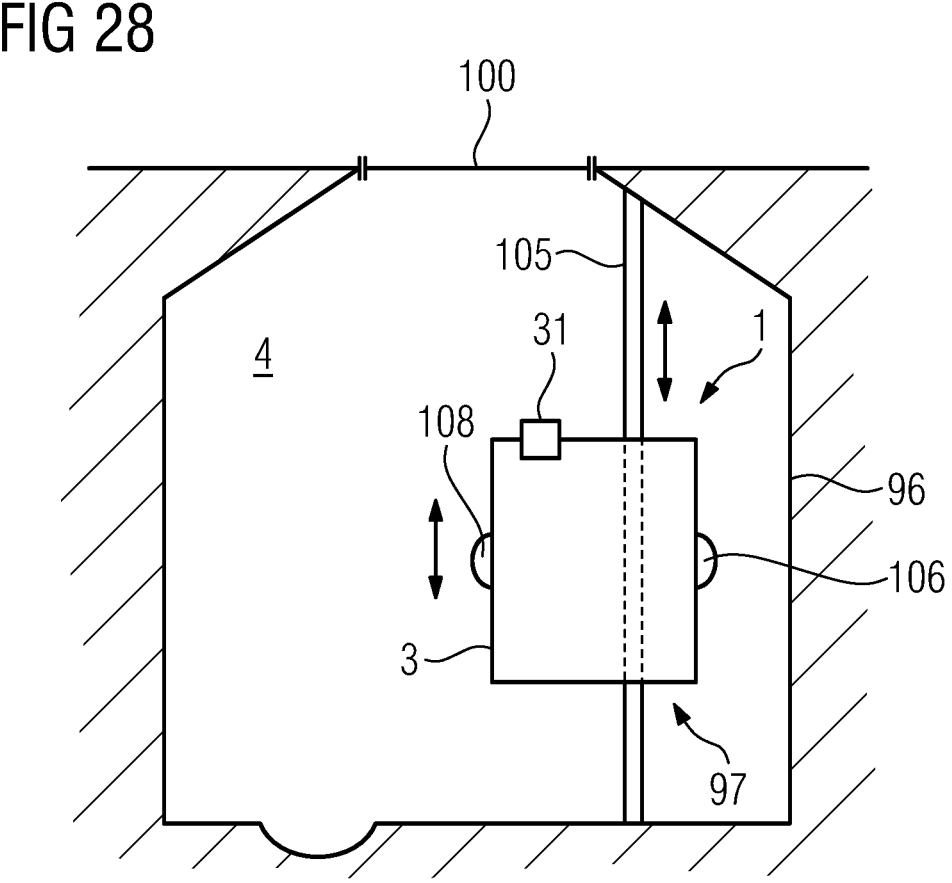

On the basis of the embodiments shown in FIGS. 26 to 28, there is also the possibility of a movable guide, in particular linearly, of the housing part 3 inserted into a manhole 96 along and/or relative to a wall of the manhole 96. The housing part 3 here is thus not fastened via a corresponding fastening device 35, 73 but instead is guided movably along and/or relative to a wall of the manhole 96, in particular linearly, by means of a guide device 97. By means of a such a guide device 97, it is thus possible for the housing part 3, which is inserted into the manhole 96 plus components of the apparatus 1 arranged therein and/or thereon, to be guided movably, in particular linearly, to be moved inside the manhole 96. Movements of the housing part 3 take place along an axis of movement running vertically, indicated by the double arrow oriented vertically, i.e., for example, along an axis of symmetry or a central axis of the manhole 96. The housing part 3 is guided so it is movable and secured against tilting in the manhole 96 by means of the guide device 97. The guide device 97 thus prevents the housing part 3 from tilting in the manhole 96.

In the embodiment according to FIG. 26, a guide device 97 is shown, comprising multiple wheel-type or roller-type guide elements 98 arranged in distribution on and/or around the housing part 3; by means of these guide elements, the housing part 3 is guided movably along the wall of the manhole 96, so that it can roll along the wall of the manhole 96. Corresponding wheel-type or roller-type guide elements 98 are in direct contact with the wall of the manhole 96, so that no special measures are necessary for implementing the movable guidance of the housing part 3 on the wall side. The wheel-type or roller-type guide elements 98 are specifically wheels and/or rollers.

The wheel-type or roller-type guide elements 98 are supported on a holding device 99 arranged on designed on the housing part 3. The wheel-type or roller-type guide elements 98 are braced by means of the holding device 99 against the wall of the manhole 96. A secure vertical positioning of the housing part 3 in the manhole 96 is possible due to such a holding and bracing. The tensioning force is selected so that uncontrolled sinking of the housing part 3 is prevented; vertical movements of the housing part 3, for example, caused by water surge-induced buoyance forces, in particular in the direction of a manhole cover 100 and/or in the direction of an upper manhole opening, are likewise possible.

The holding device 99 comprises holding arms 101, which are mounted foldably and/or pivotably on the housing part 3 and are foldable or pivotable against the wall of the manhole 96. The holding arms 101 are coupled to a tension element 102, in particular a spring element, for example, in the form of a compression spring. A tensioning force, in particular a spring force, bracing the guide elements 98 against the wall of the manhole 96 is exerted on the holding arms 101 by means of the tension elements 102 arranged between the housing part 3 and the respective holding arms 101. By means of a holding device 99 designed in such a way, the housing part 3 can be inserted into multiple manholes 96 having different diameters and braced (at an angle) against the manhole walls.

A holding device 99 shown with dotted lines comprises holding arms 101 that can be extended, in particular like a telescope, and can be lengthened radially (with respect to the axis of symmetry or the central axis of the housing part 3 and/or of the manhole 96) toward the walls of the manhole 96 (cf. the horizontal double arrow). These holding arms 101 can be coupled similarly to corresponding tension elements 102 in particular spring elements, for example, in the form of compression springs.

In the embodiment according to FIG. 27, a guide device 97 is shown, comprising a gearwheel-type linear guide element 103 on the housing-part side and a corresponding toothed rack-type linear guide element 104 that corresponds and/or interacts with it on the (manhole) wall side. By means of the guide device 97, the housing part 3 is guided so that it is linearly movable on the wall of the manhole 96. In this case, the guide device 97 thus also comprises guide elements in the form of corresponding linear guide elements 104 in the form of toothed racks on the wall side. The linear guide elements 103, 104 on the housing-part side and on the wall side are in mechanical engagement and/or a mechanical operative connection, i.e., they interact, forming a corresponding linear guide.

For the embodiments shown in FIGS. 26 and 27, it likewise holds that the respective guide devices 97 may comprise a drive device (not shown), in particular motorized, that is or can be coupled to at least one guide element 98 and/or linear guide element 103, 104 and is equipped to transfer a drive force, which induces a unidirectional or bidirectional drive movement in the guide elements 98 and/or linear guide elements 103, 104, to guide elements 98 and/or linear guide element 103, 104. Such a drive device may be designed or arranged on or in the housing part 3. Alternatively or additionally, a corresponding drive device may also be designed or arranged in or on a corresponding guide element 98 and/or linear guide element 103, 104, i.e., for example, integrated into a wheel-type or roller-type guide element 98 or into a gearwheel. A corresponding drive device may be an electric motor whose power is supplied like the power supply of other electrical and/or electronic components of the apparatus 1.

On the basis of the embodiment according to FIG. 28, it can be seen that a guide device 97 may also comprise a profile-type or rod-type guide element 105 fastened in the manhole 96 and arranged on the housing part 3 and/or passing through the latter, in particular axially. The housing part 3 here is also guided so that it is movable linearly relative to the profile rod-type guide element 105. This also includes fastening of the housing part 3 on the profile-type or rod-type guide element 105, which is in turn fastened on the manhole side, i.e., being walled, bolted, etc., for example. As can be seen, the profile-type or rod-type guide element 105 in the embodiment is not in direct contact with a manhole wall but instead is arranged concentrically inside the manhole 96. Such a profile-type or rod-type guide element 105 may also be expedient in particular in the embodiment according to FIG. 26, which is why it is also represented there with a dotted line because it is optional.

On the basis of the embodiment according to FIG. 28, it can also be seen that for implementation or support of movements of the housing part 3 in the manhole 96, floats 106 may be present. The positioning of the floats 106 on the housing part 3 is above an optional closing body 15, which is shown with a dotted line, because it is within the housing part 3 so that water rising in the manhole 96 first reaches the floats 106 on the housing-part side (the closing body 15 is already in the closed position). As shown in FIG. 28, it is possible to arrange separate floats 106 on the housing part 3.

Alternatively or additionally, the housing part 3 may already be designed with integrated floats 106. This may be implemented structurally, for example, through a housing part wall, which defines or has at least one cavity. The cavity is filled with air, for example. It is also conceivable to manufacture a housing part wall of a low-density material which floats on a water surface and does not sink because of the difference in density. In all cases, an upward movement of the housing part 3 occurs due to a rise in the water level in the manhole 96, and the downward movement of the housing part 3 is induced by a drop in the water level in the manhole 96.

For all the embodiments, it is true that the housing part 3 may be provided with reinforcing structures to increase the mechanical stability of the housing part 3. Corresponding reinforcing structures may be designed, for example, in the form of rings or ribs. Corresponding reinforcing structures may be present as separate components, which are to be placed on and/or connected to the housing part 3 or are designed to be integral with the housing part 3.

All the embodiments of the apparatuses 1 shown in the figures and/or individual features or multiple features of the embodiments shown in the figures may be combined with one another in any desired way.

The invention claimed is:

1. An apparatus (1) for holding a bait (2) for rodents, comprising:
   a housing (3) adapted to be inserted into a manhole, said housing comprising a housing wall that defines a cavity, the housing wall having a closed top section, a continuous sidewall and an at least partially open bottom section,
   at least one bait platform (8) arranged in the housing (3) delimiting at least one passage opening (9) through which a rodent can gain access to bait (2) arranged in the housing (3); wherein
   the housing has a given internal volume and the material comprising the housing wall is impervious to fluid the closed top section and the continuous sidewall configured to develop a counter-pressure in the cavity when water enters the housing (3) or rises within the housing (3), which counter-pressure opposes rise of the water within the cavity.

2. The apparatus according to claim 1, wherein the at least one bait platform (8) comprises two or more bait platforms (8) arranged in the housing (3), each delimiting at least one passage opening (9) through which a rodent can gain access to bait (2) arranged in the housing (3).

3. The apparatus according to claim 2, further comprising an intermediate space (9a) formed between two adjacently arranged bait platforms (8).

4. The apparatus according to claim 1, wherein the at least one passage opening (9) of a first bait platform (8) is arranged offset to the at least one passage opening (9) of another bait platform (8) arranged next to the first bait platform (8).

5. The apparatus according to claim 1, characterized in that at least one bait platform (8) is arranged at least partly with a bait platform section running at least partly with an inclination or a curvature relative to at least one other bait platform (8).

6. The apparatus according to claim 1, wherein the at least one bait platform (8) is provided in at least some sections with a surface structuring that influences the flow of water flowing along it.

7. The apparatus according to claim 1, wherein the at least one bait platform (8) is configured designed with two or more openings passing through it in at least some sections.

8. The apparatus according to claim 1, wherein the at least one bait platform (8) is configured to at least partly extend through the housing (3) in a spiral or helical form.

9. The apparatus according to claim 1, further comprising at least one closing body (15) mounted movably relative to the at least one bait platform (8), wherein in an open position the closing body (15) is moved away from the at least one bait platform (8) such that the respective at least one passage opening (9) delimited by the bait platform (8) is exposed, and, in a closed position is moved toward the at least one bait platform (8) such that the respective at least one passage opening (9) delimited by the bait platform (8) is closed.

10. The apparatus according to claim 9, wherein the closing body (15) comprises at least one float.

11. The apparatus according to claim 1, further comprising at least one receiving chamber (31) formed or arranged in a receiving space (5) delimited by the housing (3), such that electrical electronic components of the apparatus (1) is optionally arranged in said receiving chamber.

12. The apparatus according to claim 1, further comprising at least one receiving chamber (31) configured to contain an electrical and/or one or more electronic components of the apparatus (1), which receiving chamber (31) comprises a receiving-chamber-base body (44) which delimits a receiving chamber volume (43) for receiving electrical or electronic components of the apparatus (1), said receiving-chamber-base body (44) at least partially protruding into the cavity of the housing (3).

13. The apparatus according to claim 11, wherein the receiving chamber (31) is releasably fastenable on the housing (3), wherein the receiving chamber (31) is configured to be releasably fastened on the housing (3) by interaction of at least one fastening section (45) on the housing (3) with at least one fastening section (46) on a receiving chamber base body (44).

14. The apparatus according to claim 13, wherein the receiving chamber (31) is configured on the housing (3) and mounted rotatably relative to the housing (3), thereby being adapted to rotate between a fastened position in which the at least one fastening section (45) on the housing (3) and the at least one fastening section (46) on the receiving-chamber-base-body (44) interact in a form-fitting manner so that the receiving chamber (31) is releasably fastened on the housing (3), and a release position in which the at least one fastening section (45) on the housing (3) and the at least one fastening section (46) on the receiving chamber base body (44) do not interact so that the receiving chamber (31) is releasable from the housing (3).

15. The apparatus according to claim 14, wherein the receiving chamber (31) has in a region of an upper exposed cover section (53) at least one tool working region (54) configured to engage in form fitting manner with an optional tool (55) such that, when engaged with the tool (55) rotational movements can be transferred to the receiving chamber (31) to convert the receiving chamber (31) from the fastened position into the release position and vice versa.

16. The apparatus according to claim 1, further comprising at least one bait holding device (12) for holding at least one bait (2), wherein the bait-holding device (12) is configured on a section of a receiving chamber (31) protruding into the cavity on the housing (3).

17. The apparatus according to claim 1, further comprising at least one monitoring device (83) configured to monitor at least one part of the cavity delimited by the housing (3) configured in or on at least one receiving chamber (31), said receiving chamber (31) configured to be arranged in the cavity (5) delimited by the housing (3), wherein at least one electrical or an electronic component of the apparatus (1) is positioned in said receiving chamber (31).

18. The apparatus according to claim 1, further comprising a water surge protection element (61) configured to prevent the penetration of water into the cavity delimited by the housing (3).

19. The apparatus according to claim 1, further comprising a fastening device (73) adapted for releasable fastening of the housing (3) to a manhole wall of a sewer system (4), wherein the fastening device (73) comprises at least one first fastening element (74) extending around the housing (3) on the outside circumference, and at least one second fastening element (75) adapted to fasten the first fastening element (74) on the wall of the sewer system (4).

20. The apparatus according to claim 19, wherein the second fastening element (75) comprises at least one fastening-element section (75a) extending around the housing (3) on a top side of the housing (3) in at least some sections and being releasable on an exposed portion of the top side of the housing (3).

21. The apparatus according to claim 1, further comprising at least one guide device (97) configured to moveably guide the housing (3) inserted into a manhole (96) relative to a wall of the manhole (96).

22. The apparatus according to claim 21, wherein the guide device (97) comprises at least one wheel-type or roller-type guide element (98) by means of which the housing (3) can be guided on the wall of the manhole (96).

23. The apparatus according to claim 22, wherein the at least one wheel-type or roller-type guide element (98) is mounted on a holding device (99) that is configured or arranged on the housing (3), wherein the wheel-type or roller-type guide element (98) can be braced against the wall of the manhole (96) via the holding device (99).

24. The apparatus according to claim 23, wherein the guide device (97) comprises at least one gearwheel-type or toothed rack-type linear guide element (103) on the housing (3) and at least one corresponding gearwheel or toothed rack-type linear guide element (104) on a sewer wall side by means of which the housing (3) is capable of being guided movably linearly on the wall of the manhole (96).

25. The apparatus according to claim 21, wherein the guide device (97) comprises at least one drive device that is capable of being coupled to at least one guide element (98, 103, 104) and is configured to transmit a drive force inducing a drive movement in the at least one guide element (98, 103, 104) to the at least guide element (98, 103, 104).

26. The apparatus according to claim 21, wherein the guide device (97) comprises at least one rod-type guide element (105) that is capable of being fastened in the manhole (96) and is arranged on the housing (3) or passes through said housing (3), wherein the housing (3) is guided to be movable relative to the rod-type guide element (105).

27. The apparatus according to claim 1, further comprising at least one float (106) configured or arranged in or on the housing (3).

28. A manhole, comprising an apparatus (1) for holding a bait (2) for rodents, the apparatus comprising:
  a housing (3) adapted to be inserted into the manhole, said housing comprising a housing wall that defines a cavity, the housing wall having a closed top section, a continuous sidewall and an at least partially open bottom section,
  at least one bait platform (8) arranged in the housing (3) delimiting at least one passage opening (9) through which a rodent can gain access to bait (2) arranged in the housing (3); wherein
  the housing has a given internal volume and the material comprising the housing wall is impervious to fluid the closed top section and the continuous sidewall configured to develop a counter-pressure in the cavity when water enters the housing (3) or rises within the housing (3), which counter-pressure opposes rise of the water within the cavity.

* * * * *